US010455228B2

(12) United States Patent
Seregin et al.

(10) Patent No.: US 10,455,228 B2
(45) Date of Patent: Oct. 22, 2019

(54) DETERMINING PREDICTION PARAMETERS FOR NON-SQUARE BLOCKS IN VIDEO CODING

(71) Applicant: QUALCOMM Incorporated, San Diego, CA (US)

(72) Inventors: Vadim Seregin, San Diego, CA (US); Xin Zhao, San Diego, CA (US); Amir Said, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 225 days.

(21) Appl. No.: 15/463,474

(22) Filed: Mar. 20, 2017

(65) Prior Publication Data

US 2017/0272759 A1    Sep. 21, 2017

Related U.S. Application Data

(60) Provisional application No. 62/311,265, filed on Mar. 21, 2016.

(51) Int. Cl.
*H04N 19/159* (2014.01)
*H04N 19/11* (2014.01)
(Continued)

(52) U.S. Cl.
CPC .......... *H04N 19/11* (2014.11); *H04N 19/103* (2014.11); *H04N 19/119* (2014.11); *H04N 19/136* (2014.11); *H04N 19/159* (2014.11); *H04N 19/167* (2014.11); *H04N 19/176* (2014.11); *H04N 19/186* (2014.11); *H04N 19/46* (2014.11); *H04N 19/593* (2014.11);
(Continued)

(58) Field of Classification Search
CPC .............................. H04N 19/11; H04N 19/119
USPC ....................................................... 375/240
See application file for complete search history.

(56) References Cited

U.S. PATENT DOCUMENTS

2012/0140830 A1    6/2012   Xu et al.
2012/0320974 A1*  12/2012   Li ......................... H04N 19/159
                                                            375/240.12
(Continued)

FOREIGN PATENT DOCUMENTS

WO    2016074567 A1    5/2016
WO    2017058635 A1    4/2017

OTHER PUBLICATIONS

Alshina E., et al., "Description of Exploration Experiments on Coding Tools," Joint Video Exploration Team (JVET) of ITU-T SG 16 WP 3 and ISO/IEC JTC 1/SC 29/WG 11, 2nd Meeting: San Diego, CA, Document: JVET-B1011-V2, Feb. 20-26, 2016, pp. 1-5.
(Continued)

*Primary Examiner* — William C Vaughn, Jr.
*Assistant Examiner* — Jerry T Jean Baptiste
(74) *Attorney, Agent, or Firm* — Shumaker & Sieffert, P.A.

(57) ABSTRACT

A method of decoding video data comprising receiving a block of video data encoded using a position dependent intra prediction combination (PDPC) mode, the block of video data having a non-square shape defined by a width and a height, determining one or more PDPC parameters based on one or more of the width or the height of the block of video data, and decoding the block of video data using the PDPC mode and the determined PDPC parameters.

26 Claims, 12 Drawing Sheets

(51) Int. Cl.

| | |
|---|---|
| H04N 19/176 | (2014.01) |
| H04N 19/186 | (2014.01) |
| H04N 19/46 | (2014.01) |
| H04N 19/61 | (2014.01) |
| H04N 19/70 | (2014.01) |
| H04N 19/91 | (2014.01) |
| H04N 19/119 | (2014.01) |
| H04N 19/593 | (2014.01) |
| H04N 19/136 | (2014.01) |
| H04N 19/103 | (2014.01) |
| H04N 19/167 | (2014.01) |
| H04N 19/184 | (2014.01) |
| H04W 84/04 | (2009.01) |

(52) U.S. Cl.
CPC ............. *H04N 19/61* (2014.11); *H04N 19/70* (2014.11); *H04N 19/91* (2014.11); *H04N 19/184* (2014.11); *H04W 84/042* (2013.01)

(56) References Cited

U.S. PATENT DOCUMENTS

| | | | |
|---|---|---|---|
| 2013/0195199 A1 | 8/2013 | Guo et al. | |
| 2014/0126630 A1 | 5/2014 | Park et al. | |
| 2015/0063457 A1 | 3/2015 | Gamei et al. | |
| 2015/0281687 A1 | 10/2015 | Yasugi et al. | |
| 2016/0173888 A1 | 6/2016 | Park et al. | |
| 2017/0094304 A1 | 3/2017 | Chou et al. | |
| 2017/0188028 A1* | 6/2017 | Park | H04N 19/176 |
| 2017/0272748 A1 | 9/2017 | Seregin et al. | |
| 2018/0262756 A1* | 9/2018 | Filippov | H04N 19/184 |

OTHER PUBLICATIONS

An J., et al., "Block partitioning structure for next generation video coding," MPEG doc. m37524 and ITU-T SG16 Doc. COM16-C966-E, Oct. 2015, pp. 1-7.

An J., et al., "Quadtree plus binary tree structure integration with JEM tools," 2. JVET Meeting, Feb. 20, 2016-Feb. 26, 2016, San Diego, CA (The Joint Video Exploration Team of ISO/IEC JTC1/SC29/WG11 and ITU-T SG.16), No. JVET-B0023-v2, Feb. 20, 2016 (Feb. 20, 2016), XP030150012. Retrieved from Internet: URL: http://phenix.int-evry.fr/jvet/, 10 pp.

Bossen F., et al., "JEM Software Manual," Joint Collaborative Team on Video Coding (JCT-VC) of ITU-T SG16 WP3 and ISO/IEC JTC1/SC29/WG11, Document: JCTVC-Software Manual, Retrieved on Aug. 3, 2016, pp. 1-29.

Huang H., "EE2.1: Quadtree plus binary tree structure integration with JEM tools," Joint Video Exploration Team (JVET) of ITU-T SG 16 WP 3 and ISO/IEC JTC 1/SC 29/WG 11, 3rd Meeting: Geneva, CH, May 26-Jun. 1, 2016, JVET-C0024, 5 pp.

International Search Report and Written Opinion—PCT/US2017/023378—ISA/EPO—dated Jun. 7, 2017, 17 pp.

Park M.W., et al., "Cross-check of JVET-C0024 (QTBT)," Joint Video Exploration Team (JVET) of ITU-T SG 16 WP 3 and ISO/IEC JTC 1/SC 29/WG 11, 3rd Meeting: Geneva, CH, Document: JVET-C0056, May 26-31, 2016, pp. 1-3.

Said A., et al., "Position dependent intra prediction combination," Qualcomm Incorporated, International Organisation for Standardisation Organisation Internationale De Normalisation ISO/IEC JTC1/SC29/WG11 Coding of Moving Pictures and Audio, ISO/IEC JTC1/SC29/WG11 MPEG2015/M37502, Geneva, CH, Oct. 2015, 4 pp.

Suehring K., et al., "JEVT common test conditions and software reference configurations," 2nd Meeting, Feb. 20-26, 2016, San Diego, CA; Joint Collaborative Video Exploration Team (JVET) of ITU-T-SG 16 WP 3 and ISO/IEC JTC 1/SC 29/WG 11, JVET-B1010, Apr. 4, 2016, 4 pp.

Zhang L., et al., "Multiple Direct Modes for chroma intra coding," 4, JVET Meeting; Oct. 15, 2016-Oct. 21, 2016; Chengdu, CN (The Joint Video Exploration Team of ISO/IEC JTC1/SC29/WG11 and ITU-T SG.16); URL: http://phenix.int-evry.fr/jvet/,, No. JVET-D0111, Oct. 6, 2016 (Oct. 6, 2016), XP030150356, section 2, 4 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

U.S. Appl. No. 15/463,428, filed by Vadim Seregin, filed Mar. 20, 2017.

Response to Written Opinion dated Jun. 7, 2017, from International Application No. PCT/US2017/023378, filed on Jan. 10, 2018, 26 pp.

Second Written Opinion from International Application No. PCT/US2017/023378, dated Feb. 5, 2018, 5 pp.

International Preliminary Report on Patentability from International Application No. PCT/US2017/023378, dated May 25, 2018, 26 pp.

* cited by examiner

DETERMINING PREDICTION PARAMETERS FOR NON-SQUARE BLOCKS IN VIDEO CODING

This application claims the benefit of U.S. Provisional Application No. 62/311,265, filed Mar. 21, 2016, the entire content of which is incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC or H.265) standard, and extensions of such standards. The video devices may transmit, receive, encode, decode, and/or store digital video information more efficiently by implementing such video coding techniques.

Video coding techniques include spatial (intra picture) prediction and/or temporal (inter picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Pictures may be referred to as frames, and reference pictures may be referred to as reference frames.

Spatial or temporal prediction results in a predictive block for a block to be coded. Residual data represents pixel differences between the original block to be coded and the predictive block. For further compression, the residual data may be transformed from the pixel domain to a transform domain, resulting in residual transform coefficients, which then may be quantized. Entropy coding may be applied to achieve even more compression.

SUMMARY

This disclosure describes techniques for coding video data that has been partitioned using an independent luma and chroma partition framework. In some examples, this disclosure describes techniques for determining how to reuse coding information from luma blocks for chroma blocks when there are two or more luma blocks that correspond to the chroma block (e.g., when two or more luma blocks are co-located with a chroma block).

In other examples, this disclosure describes techniques for determining parameters for a position dependent intra prediction comparison (PDPC) mode when blocks of video data may be partitioned into non-square blocks. In some examples, PDPC parameters may be determined using multiple lookup tables, including separate tables for vertical-related parameters and horizontal-related parameters.

In one example of the disclosure, a method of decoding video data comprises receiving a bitstream of encoded video data, the encoded video data representing partitioned luma blocks and partitioned chroma blocks, wherein the chroma blocks are partitioned independently of the luma blocks, determining a respective coding mode corresponding to the respective partitioned luma blocks, decoding the respective partitioned luma blocks according to the determined respective coding modes, decoding a first syntax element indicating that the respective coding modes associated with the respective partitioned luma blocks are to be used for decoding a first partitioned chroma block, wherein the first partitioned chroma block is aligned with two or more partitioned luma blocks, determining a chroma coding mode for the first partitioned chroma block according to a function of the respective coding modes of the two or more partitioned luma blocks, and decoding the first partitioned chroma block in accordance with the determined chroma coding mode.

In another example of the disclosure, an apparatus configured to decode video data comprises a memory configured to store a bitstream of encoded video data and one or more processors configured to receive the bitstream of encoded video data, the encoded video data representing partitioned luma blocks and partitioned chroma blocks, wherein the chroma blocks are partitioned independently of the luma blocks, determine a respective coding mode corresponding to the respective partitioned luma blocks, decode the respective partitioned luma blocks according to the determined respective coding modes, decode a first syntax element indicating that the respective coding modes associated with the respective partitioned luma blocks are to be used for decoding a first partitioned chroma block, wherein the first partitioned chroma block is aligned with two or more partitioned luma blocks, determine a chroma coding mode for the first partitioned chroma block according to a function of the respective coding modes of the two or more partitioned luma blocks, and decode the first partitioned chroma block in accordance with the determined chroma coding mode.

In another example of the disclosure, an apparatus configured to decode video data comprises means for receiving a bitstream of encoded video data, the encoded video data representing partitioned luma blocks and partitioned chroma blocks, wherein the chroma blocks are partitioned independently of the luma blocks, means for determining a respective coding mode corresponding to the respective partitioned luma blocks, means for decoding the respective partitioned luma blocks according to the determined respective coding modes, means for decoding a first syntax element indicating that the respective coding modes associated with the respective partitioned luma blocks are to be used for decoding a first partitioned chroma block, wherein the first partitioned chroma block is aligned with two or more partitioned luma blocks, means for determining a chroma coding mode for the first partitioned chroma block according to a function of the respective coding modes of the two or more partitioned luma blocks, and means for decoding the first partitioned chroma block in accordance with the determined chroma coding mode.

In another example, this disclosure describes a non-transitory computer-readable storage medium storing instructions that, when executed, causes one or more processors configured to decoded video data to receive the bitstream of encoded video data, the encoded video data representing partitioned luma blocks and partitioned chroma blocks, wherein the chroma blocks are partitioned independently of the luma blocks, determine a respective coding mode corresponding to the respective partitioned luma blocks, decode the respective partitioned luma blocks according to the determined respective coding modes, decode a first syntax element indicating that the respective coding modes associated with the respective partitioned luma blocks are to be used for decoding a first partitioned chroma block, wherein the first partitioned chroma block is aligned with two or more partitioned luma blocks, determine a chroma coding mode for the first partitioned chroma block according to a function of the respective coding modes of the two or more partitioned luma blocks, and decode the first partitioned chroma block in accordance with the determined chroma coding mode.

In another example of the disclosure, a method of decoding video data comprises receiving a block of video data encoded using a position dependent intra prediction combination (PDPC) mode, the block of video data having a non-square shape defined by a width and a height, determining one or more PDPC parameters based on one or more of the width or the height of the block of video data, and decoding the block of video data using the PDPC mode and the determined PDPC parameters.

In another example of the disclosure, an apparatus configured to decode video data comprises a memory configured to store a block of video data encoded using a PDPC mode, the block of video data having a non-square shape defined by a width and a height, and one or more processors configured to receive the block of video data, determine one or more PDPC parameters based on one or more of the width or the height of the block of video data, and decode the block of video data using the PDPC mode and the determined PDPC parameters.

In another example of the disclosure, an apparatus configured to decode video data comprises means for receiving a block of video data encoded using a PDPC mode, the block of video data having a non-square shape defined by a width and a height, means for determining one or more PDPC parameters based on one or more of the width or the height of the block of video data, and means for decoding the block of video data using the PDPC mode and the determined PDPC parameters.

In another example, this disclosure describes a non-transitory computer-readable storage medium storing instructions that, when executed, cause one or more processors of a device to configured to decode video data to receive a block of video data encoded using a PDPC mode, the block of video data having a non-square shape defined by a width and a height, determine one or more PDPC parameters based on one or more of the width or the height of the block of video data, and decode the block of video data using the PDPC mode and the determined PDPC parameters.

In another example of the disclosure, a method of encoding video data comprises receiving a block of video data, the block of video data having a non-square shape defined by a width and a height, determining one or more PDPC parameters based on one or more of the width or the height of the block of video data, and encoding the block of video data using a PDPC mode and the determined PDPC parameters.

In another example of the disclosure, an apparatus configured to encode video data comprises a memory configured to store a block of video data, the block of video data having a non-square shape defined by a width and a height, and one or more processors configured to receive the block of video data, determine one or more PDPC parameters based on one or more of the width or the height of the block of video data, and encode the block of video data using a PDPC mode and the determined PDPC parameters.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

According to some video block partitioning techniques, chroma blocks of video data are partitioned independently of luma blocks of video data, such that some chroma blocks may not be directly aligned with a single corresponding luma block. As such, it becomes difficult to reuse syntax elements related to luma blocks for chroma blocks, as there may not be a one-to-one correspondence between luma blocks and chroma blocks. This disclosure describes techniques for coding a chroma block of video data using information (e.g., syntax elements) corresponding to a luma block of video data in situations where luma and chroma blocks are partitioned independently.

This disclosure also describes techniques for determining coding parameters for a position dependent intra prediction combination (PDPC) coding mode. In one example, this disclosure describes techniques for determining PDPC parameters for video blocks partitioned into non-square blocks (e.g., non-square, rectangular blocks).

Figure 1:
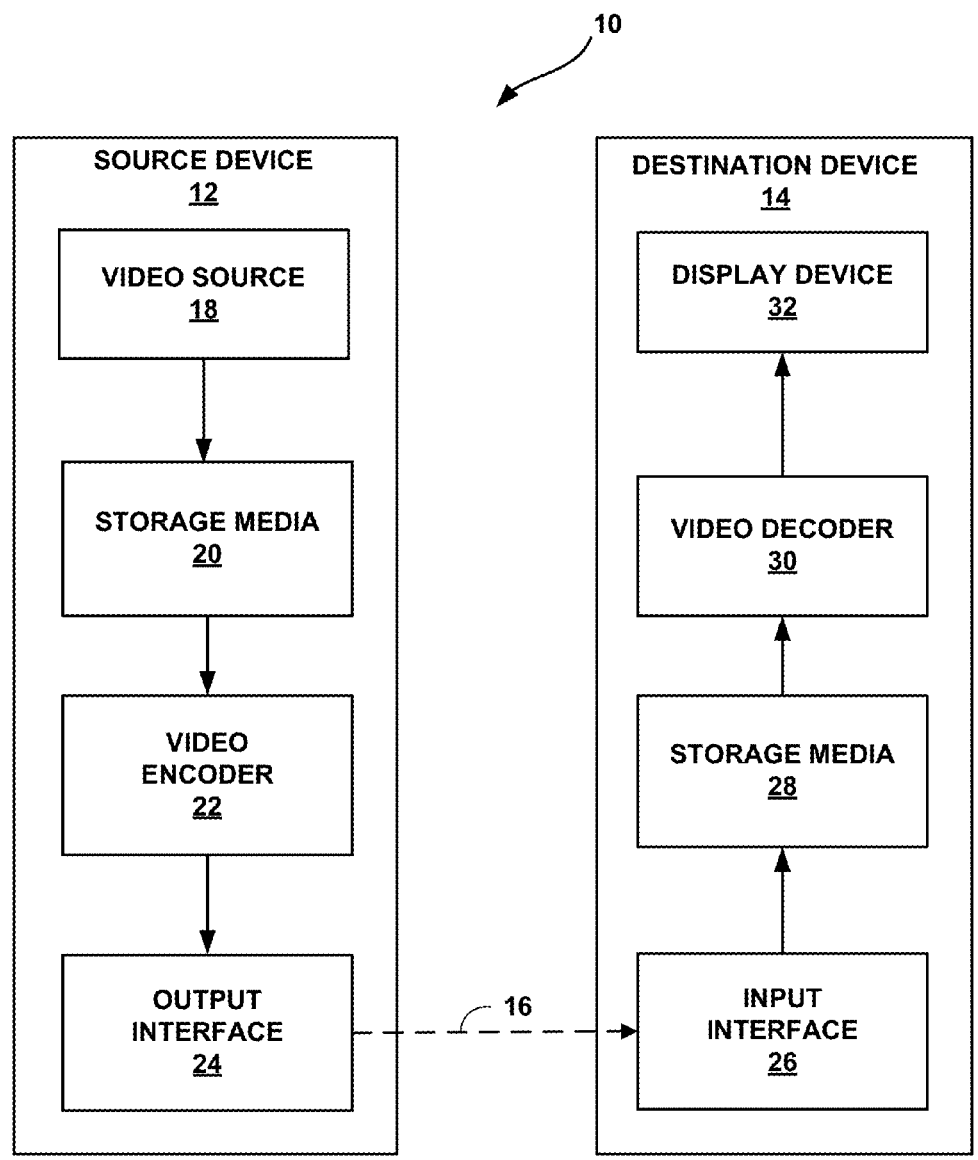
FIG. 1 is a block diagram illustrating an example video encoding and decoding system configured to implement techniques of the disclosure.

FIG. 1 is a block diagram illustrating an example video encoding and decoding system 10 that may be configured to perform the techniques of this disclosure. As shown in FIG. 1, system 10 includes source device 12 that provides encoded video data to be decoded at a later time by destination device 14. In particular, source device 12 provides the video data to destination device 14 via computer-readable medium 16. Source device 12 and destination device 14 may comprise any of a wide range of devices, including desktop computers, notebook (e.g., laptop) computers, tablet computers, set-top boxes, telephone handsets such as so-called "smart" phones (or more generally, mobile stations), tablet computers, televisions, cameras, display devices, digital media players, video gaming consoles, video streaming device, or the like. A mobile station may be any device capable of communicating over a wireless network. In some cases, source device 12 and destination device 14 may be equipped for wireless communication. Thus, source device 12 and destination device 14 may be wireless communication devices (e.g., mobile stations). Source device 12 is an example video encoding device (i.e., a device for encoding video data). Destination device 14 is an example video decoding device (i.e., a device for decoding video data).

In the example of FIG. 1, source device 12 includes video source 18, storage media 20 configured to store video data, video encoder 22, and output interface 24. Destination device 14 includes input interface 26, storage media 28 configured to store encoded video data, video decoder 30, and display device 32. In other examples, source device 12 and destination device 14 include other components or arrangements. For example, source device 12 may receive video data from an external video source, such as an external camera. Likewise, destination device 14 may interface with an external display device, rather than including an integrated display device 32.

The illustrated system 10 of FIG. 1 is merely one example. Techniques for processing and/or coding (e.g., encoding and/or decoding) video data may be performed by any digital video encoding and/or decoding device. Although the techniques of this disclosure are generally performed by a video encoding device and/or video decoding device, the techniques may also be performed by a video encoder/decoder, typically referred to as a "CODEC." Source device 12 and destination device 14 are merely examples of such coding devices in which source device 12 generates coded video data for transmission to destination device 14. In some examples, source device 12 and destination device 14 may operate in a substantially symmetrical manner such that each of source device 12 and destination device 14 include video encoding and decoding components. Hence, system 10 may support one-way or two-way video transmission between source device 12 and destination device 14, e.g., for video streaming, video playback, video broadcasting, or video telephony.

Video source 18 of source device 12 may include a video capture device, such as a video camera, a video archive containing previously captured video, and/or a video feed interface to receive video data from a video content provider. As a further alternative, video source 18 may generate computer graphics-based data as the source video, or a combination of live video, archived video, and computer-generated video. Source device 12 may comprise one or more data storage media (e.g., storage media 20) configured to store the video data. The techniques described in this disclosure may be applicable to video coding in general, and may be applied to wireless and/or wired applications. In each case, the captured, pre-captured, or computer-generated video may be encoded by video encoder 22. Output interface 24 may output the encoded video information (e.g., a bitstream of encoded video data) to computer-readable medium 16.

Destination device 14 may receive the encoded video data to be decoded via computer-readable medium 16. Computer-readable medium 16 may comprise any type of medium or device capable of moving the encoded video data from source device 12 to destination device 14. In some examples, computer-readable medium 16 comprises a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14. Destination device 14 may comprise one or more data storage media configured to store encoded video data and decoded video data.

In some examples, encoded data may be output from output interface 24 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques described in this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 26 of destination device 14 receives information from computer-readable medium 16. The information of computer-readable medium 16 may include syntax information defined by video encoder 22 of video encoder 22, which is also used by video decoder 30, that includes syntax elements that describe characteristics and/or processing of blocks and other coded units, e.g., groups of pictures (GOPs). Storage media 28 may store encoded video data received by input interface 26. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 22 and video decoder 30 each may be implemented as any of a variety of suitable video encoder and/or video decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 22 and video decoder 30 may be included in one or more encoders or decoders, either of which may be integrated as part of a combined CODEC in a respective device.

In some examples, video encoder 22 and video decoder 30 may operate according to a video coding standard. Example video coding standards include, but are not limited to, ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-View Video Coding (MVC) extensions. In addition, a new video coding standard, namely High Efficiency Video Coding (HEVC) or ITU-T H.265, including its range and screen content coding extensions, 3D video coding (3D-HEVC) and multiview extensions (MV-HEVC) and scalable extension (SHVC), has been developed by the Joint Collaboration Team on Video Coding (JCT-VC) of ITU-T Video Coding Experts Group (VCEG) and ISO/IEC Motion Picture Experts Group (MPEG).

In other examples, video encoder 22 and video decoder 30 may be configured to operate according to other video coding techniques and/or standards, including new video coding techniques being explored by the Joint Video Exploration Team (WET). In some examples of the disclosure, video encoder 22 and video decoder 30 may be configured to operate according to video coding techniques that use independent luma and chroma partitioning, such that luma and chroma blocks of video data are not required to be aligned. Such partitioning techniques may lead to the situation where a chroma block is not aligned, within a particular location of a picture, to a single luma block. In other examples of the disclosure, video encoder 22 and video decoder 30 may be configured to operate according to video coding techniques that use partitioning frameworks that allow for non-square blocks.

In accordance with the techniques of this disclosure, as will be described in more detail below, video decoder 30 may be configured to receive the bitstream of encoded video data, the encoded video data representing partitioned luma blocks and partitioned chroma blocks, wherein the chroma blocks are partitioned independently of the luma blocks, determine a respective coding mode corresponding to the respective partitioned luma blocks, decode the respective partitioned luma blocks according the determined respective coding modes, decode a first syntax element indicating that the respective coding modes associated with the respective partitioned luma blocks are to be used for decoding a first partitioned chroma block, wherein the first partitioned chroma block is aligned with two or more partitioned luma blocks, determine a chroma coding mode for the first partitioned chroma block according to a function of the respective coding modes of the two or more partitioned luma blocks, and decode the first partitioned chroma block in accordance with the determined chroma coding mode. Video encoder 22 may be configured to perform techniques reciprocal to that of video decoder 30. In some examples, video encoder 22 may be configured to generate a syntax element that indicates whether or not a chroma block is to reuse coding mode information from two or more luma blocks based the function of the respective coding modes of the two or more partitioned luma blocks.

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (e.g., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture (e.g., an encoded video bitstream), video encoder 22 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

To generate a coded CTU, video encoder 22 may recursively perform quadtree partitioning on the coding tree blocks of a CTU to divide the coding tree blocks into coding blocks, hence the name "coding tree units." A coding block is an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 22 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 22 may generate predictive blocks (e.g., luma, Cb, and Cr predictive blocks) for prediction blocks (e.g., luma, Cb, and Cr prediction blocks) of each PU of the CU.

Video encoder 22 may use intra prediction or inter prediction to generate the predictive blocks for a PU. If video encoder 22 uses intra prediction to generate the predictive blocks of a PU, video encoder 22 may generate the predictive blocks of the PU based on decoded samples of the picture that includes the PU.

After video encoder 22 generates predictive blocks (e.g., luma, Cb, and Cr predictive blocks) for one or more PUs of a CU, video encoder 22 may generate one or more residual blocks for the CU. As one example, video encoder 22 may generate a luma residual block for the CU. Each sample in the CU's luma residual block indicates a difference between a luma sample in one of the CU's predictive luma blocks and a corresponding sample in the CU's original luma coding block. In addition, video encoder 22 may generate a Cb residual block for the CU. In one example of chroma prediction, each sample in the Cb residual block of a CU may indicate a difference between a Cb sample in one of the CU's predictive Cb blocks and a corresponding sample in the CU's original Cb coding block. Video encoder 22 may also generate a Cr residual block for the CU. Each sample in the CU's Cr residual block may indicate a difference between a Cr sample in one of the CU's predictive Cr blocks and a corresponding sample in the CU's original Cr coding block. However, it should be understood that other techniques for chroma prediction may be used.

Furthermore, video encoder 22 may use quadtree partitioning to decompose the residual blocks (e.g., the luma, Cb, and Cr residual blocks) of a CU into one or more transform blocks (e.g., luma, Cb, and Cr transform blocks). A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may have a luma transform block, a Cb transform block, and a Cr transform block. The luma transform block of the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 22 may apply one or more transforms a transform block of a TU to generate a coefficient block for the TU. For instance, video encoder 22 may apply one or more transforms to a luma transform block of a TU to generate a luma coefficient block for the TU. A coefficient block may be a two-dimensional array of transform coefficients. A transform coefficient may be a scalar quantity. Video encoder 22 may apply one or more transforms to a Cb transform block of a TU to generate a Cb coefficient block for the TU. Video encoder 22 may apply one or more transforms to a Cr transform block of a TU to generate a Cr coefficient block for the TU.

After generating a coefficient block (e.g., a luma coefficient block, a Cb coefficient block or a Cr coefficient block), video encoder 22 may quantize the coefficient block. Quantization generally refers to a process in which transform coefficients are quantized to possibly reduce the amount of data used to represent the transform coefficients, providing further compression. After video encoder 22 quantizes a coefficient block, video encoder 22 may entropy encode syntax elements indicating the quantized transform coefficients. For example, video encoder 22 may perform context-adaptive binary arithmetic coding (CABAC) on the syntax elements indicating the quantized transform coefficients.

Video encoder 22 may output a bitstream that includes a sequence of bits that forms a representation of coded pictures and associated data. Thus, the bitstream comprises an encoded representation of video data. The bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units may include a NAL unit header and encapsulates a RBSP. The NAL unit header may include a syntax element indicating a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Video decoder 30 may receive an encoded video bitstream generated by video encoder 22. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 22. For instance, video decoder 30 may use motion vectors of PUs to determine predictive blocks for the PUs of a current CU. In addition, video decoder 30 may inverse quantize coefficient blocks of TUs of the current CU. Video decoder 30 may perform inverse transforms on the coefficient blocks to reconstruct transform blocks of the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

In some example video codec frameworks, such as the quadtree partitioning framework of HEVC, partitioning of video data into blocks for the color components (e.g., luma blocks and chroma blocks) is performed jointly. That is, in some examples, luma blocks and chroma blocks are partitioned in the same manner such that no more than one luma block corresponds to a chroma block in a particular location within a picture. In one example, a partition of a block of video data may be further divided into sub-blocks. Information (e.g., sample values and syntax elements indicating how the video block is to be coded) relating to the video block or partition of the video block is stored at the sub-block level. Or, more generally, information relating to video blocks or partitions of the video block may be stored with relation to one or more representative locations (e.g., corresponding to any sample(s) or sub-samples(s)) of a block of video data. For example, if a partition is 16×16 pixels, and each sub-block in the partition is 4×4 pixels, then there are 16 sub-blocks in the partition. Information is stored at sub-block granularity, 4×4 in this example, and all 16 sub-blocks may have the same information.

In the context of this disclosure, the terms "partition," "block," and "partitioned block" may be used interchangeably. In general, a block is a group of samples (e.g., luma or chroma samples) on which video coding is performed. In the context of this disclosure, a "sub-block" is a division of a block having an associated memory location that stores coding mode information for the block.

Video encoder 22 and video decoder 30 may allocate locations in a memory for storing the information for each representative location (e.g., sub-block). In some examples, the values of the information (e.g., values of particular syntax elements for a particular coding mode) may be stored in a separate memory location associated with each representative location (e.g., sub-block). In other examples, the information may be stored once for one of a plurality of representative locations (e.g., sub-blocks) of a partition. The memory locations of the other sub-blocks of the partition may include pointers to the memory location that stores the actual values of the information. Techniques of this disclosure will be described below with reference to sub-blocks, though it should be understood that any representative location of a block may be used.

As mentioned above, the information stored at the sub-block level can be any information that is used to perform coding processes on the partition. Such information may be signaled syntax information or derived supplemental information. One example of derived supplemental information may be information used to code chroma blocks that is derived from information related to coding luma blocks. One example of derived supplemental information for use in HEVC is direct mode information, where luma intra prediction information (e.g., intra prediction direction) is used for chroma prediction without signaling the intra prediction direction itself for chroma blocks. Other examples of the information may be mode decision, such as intra prediction or inter prediction, intra prediction direction, motion information, and the like.

When luma and chroma partition sizes are compared, chroma color format (e.g., chroma sub-sampling format), such as 4:4:4, 4:2:2, 4:2:0, can be taken into the account. For example, if a luma partition is 16×16 pixels, the corresponding or collocated chroma partition is 8×8 pixels for the 4:2:0 color format, and is 16×16 pixels for the 4:4:4 chroma color format. Partitions are not necessarily square, and can be, for example, rectangular in shape. As such, for a 4:2:0 chroma sub-sampling format, luma and chroma partitions will not be the same size. However, when luma and chroma blocks are partitioned jointly, the resulting partitioning still results in only one luma block corresponding to any particular chroma block.

A quadtree plus binary tree (QTBT) partition structure is currently being studied by the Joint Video Exploration Team (WET). In J. An et al., "Block partitioning structure for next generation video coding", International Telecommunication Union, COM16-C966, September 2015 (hereinafter, "VCEG proposal COM16-C966"), QTBT partitioning techniques were described for future video coding standard beyond HEVC. Simulations have shown that the proposed QTBT structure may be more efficient than the quadtree structure used in HEVC.

In the QTBT structure described in VCEG proposal COM16-C966, a CTB is first partitioned using quadtree partitioning techniques, where the quadtree splitting of one node can be iterated until the node reaches the minimum allowed quadtree leaf node size. The minimum allowed quadtree leaf node size may be indicated to video decoder 30 by the value of the syntax element MinQTSize. If the quadtree leaf node size is not larger than the maximum allowed binary tree root node size (e.g., as denoted by a syntax element MaxBTSize), the quadtree leaf node can be further partitioned using binary tree partitioning. The binary tree partitioning of one node can be iterated until the node reaches the minimum allowed binary tree leaf node size (e.g., as denoted by a syntax element MinBTSize) or the maximum allowed binary tree depth (e.g., as denoted by a syntax element MaxBTDepth). VCEG proposal COM16-C966 uses the term "CU" to refer to binary-tree leaf nodes. In VCEG proposal COM16-C966, CUs are used for prediction (e.g., intra prediction, inter prediction, etc.) and transform without any further partitioning. In general, according to QTBT techniques, there are two splitting types for binary tree splitting: symmetric horizontal splitting and symmetric vertical splitting. In each case, a block is split by dividing the block down the middle, either horizontally or vertically. This differs from quadtree partitioning, which divides a block into four blocks.

In one example of the QTBT partitioning structure, the CTU size is set as 128×128 (e.g., a 128×128 luma block and two corresponding 64×64 chroma blocks), the MinQTSize is set as 16×16, the MaxBTSize is set as 64×64, the MinBTSize (for both width and height) is set as 4, and the MaxBTDepth is set as 4. Quadtree partitioning is applied to the CTU first to generate quadtree leaf nodes. The quadtree leaf nodes may have a size from 16×16 (i.e., the MinQTSize is 16×16) to 128×128 (i.e., the CTU size). According to one example of QTBT partitioning, if the leaf quadtree node is 128×128, the leaf quadtree node cannot be further split by the binary tree, since the size of the leaf quadtree node exceeds the MaxBTSize (i.e., 64×64). Otherwise, the leaf quadtree node is further partitioned by the binary tree. Therefore, the quadtree leaf node is also the root node for the binary tree and has the binary tree depth as 0. The binary tree depth reaching MaxBTDepth (e.g., 4) implies that there is no further splitting. The binary tree node having a width equal to the MinBTSize (e.g., 4) implies that there is no further horizontal splitting. Similarly, the binary tree node having a height equal to MinBTSize implies no further vertical splitting. The leaf nodes of the binary tree (CUs) are further processed (e.g., by performing a prediction process and a transform process) without any further partitioning.

Figures 2A, 2B:
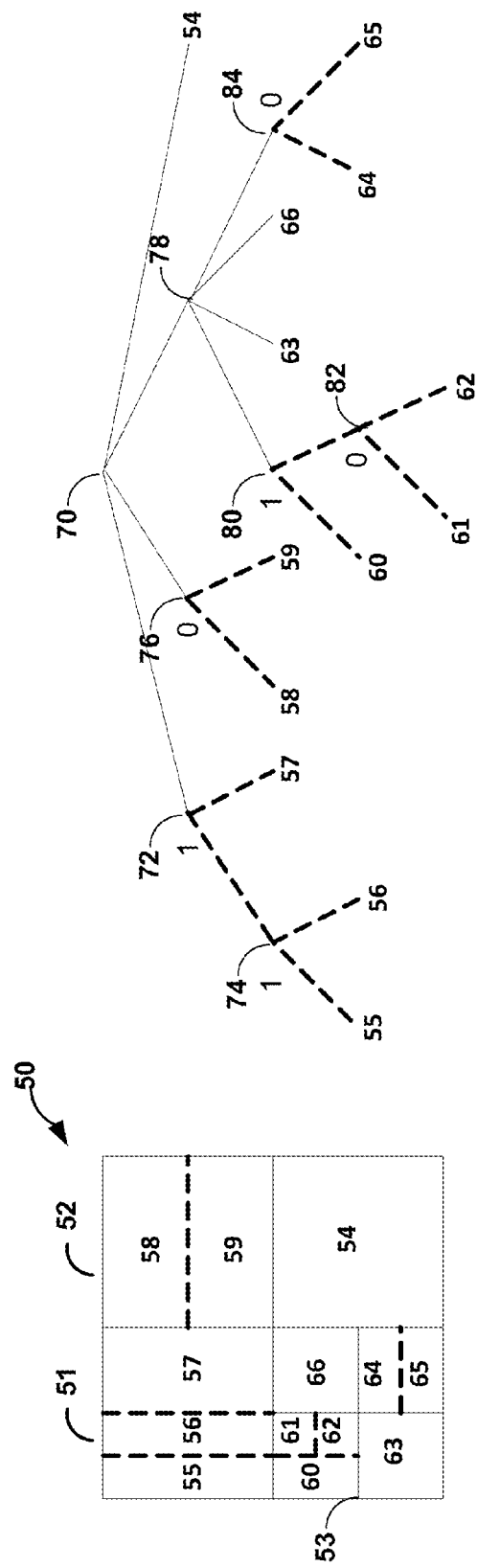
FIG. 2A is a conceptual diagram illustrating an example of block partitioning using a quadtree plus binary tree (QTBT) structure.
FIG. 2B is a conceptual diagram illustrating an example tree structure corresponding to the block partitioning using the QTBT structure of FIG. 2A.

FIG. 2A illustrates an example of a block 50 (e.g., a CTB) partitioned using QTBT partitioning techniques. As shown in FIG. 2A, using QTBT partition techniques, each of the resultant blocks is split symmetrically through the center of each block. FIG. 2B illustrates the tree structure corresponding to the block partitioning of FIG. 2A. The solid lines in FIG. 2B indicate quadtree splitting and dotted lines indicate binary tree splitting. In one example, in each splitting (i.e., non-leaf) node of the binary tree, a syntax element (e.g., a flag) is signaled to indicate the type of splitting performed (e.g., horizontal or vertical), where 0 indicates horizontal splitting and 1 indicates vertical splitting. For the quadtree splitting, there is no need to indicate the splitting type, as quadtree splitting always splits a block horizontally and vertically into 4 sub-blocks with an equal size.

As shown in FIG. 2B, at node 70, block 50 is split into the four blocks 51, 52, 53, and 54, shown in FIG. 2A, using quadtree partitioning. Block 54 is not further split, and is therefore a leaf node. At node 72, block 51 is further split into two blocks using binary tree partitioning. As shown in FIG. 2B, node 72 is marked with a 1, indicating vertical splitting. As such, the splitting at node 72 results in block 57 and the block including both blocks 55 and 56. Blocks 55 and 56 are created by a further vertical splitting at node 74. At node 76, block 52 is further split into two blocks 58 and 59 using binary tree partitioning. As shown in FIG. 2B, node 76 is marked with a 1, indicating horizontal splitting.

At node 78, block 53 is split into 4 equal size blocks using quadtree partitioning. Blocks 63 and 66 are created from this quadtree partitioning and are not further split. At node 80, the upper left block is first split using vertical binary tree splitting resulting in block 60 and a right vertical block. The right vertical block is then split using horizontal binary tree splitting into blocks 61 and 62. The lower right block created from the quadtree splitting at node 78, is split at node 84 using horizontal binary tree splitting into blocks 64 and 65.

In one example of QTBT partitioning, luma and chroma partitioning may be performed independently of each other for I-slices, contrary, for example, to HEVC, where the quadtree partitioning is performed jointly for luma and chroma blocks. That is, in some examples being studied, luma blocks and chroma blocks may be partitioned separately such that luma blocks and chroma blocks do not directly overlap. As such, in some examples of QTBT partitioning, chroma blocks may be partitioned in a manner such that at least one partitioned chroma block is not spatially aligned with a single partitioned luma block. That is, the luma samples that are co-located with a particular chroma block may be within two or more different luma partitions.

As described above, in some examples, information relating to how a chroma block is to be coded can be derived from information relating to a corresponding luma block. However if luma and chroma partitioning is performed independently, the luma and chroma blocks may not be aligned (e.g., the luma and chroma blocks may not correspond to the same set of pixels). For example, chroma partitioning can be such that the chroma blocks are larger or smaller than a corresponding luma partition. In addition, chroma blocks may spatially overlap two or more luma blocks. As explained above, if a partitioned chroma block is larger than a partitioned luma block, it can be the case than there is more than one luma block that spatially corresponds to a particular chroma block, and thus more than one set of luma information (e.g., syntax elements and the like) associated with the luma partitions corresponding to the size of the chroma partition. In such cases, it is unclear how to derive chroma information from luma information. It should be understood that such a situation may arise with any partitioning structure where luma and chroma blocks are partitioned independently, and not just with example QTBT partitioning structures being studied by the JVET.

In view of these drawbacks, this disclosure describes methods and devices for deriving chroma information from luma information for pictures partitioned using separate and/or independent luma and chroma partitioning. As described above, luma and chroma partitioning can be misaligned, e.g., being of different sizes or shapes. Derived information (e.g., determined coding mode information) from a luma block can be used as a predictor for chroma information (e.g., the coding mode to be used for a chroma block) or be used to code a chroma block of video data. Alternatively or additionally, luma information can be used for context modelling in the context coding of the chroma information. Optionally, context modelling can be combined with the prediction information. It should be understood that each of the techniques described below may be used independently or may be combined with the other techniques in any combination.

As one example of the disclosure, video encoder 22 encodes a luma block of video data using a particular coding mode (e.g., a particular intra prediction mode, a particular inter prediction mode, a particular filtering mode, a particular motion vector prediction mode, etc.). In some examples, video encoder 22 may further encode syntax elements that indicate what coding mode(s) were used to encode a particular luma block. Video decoder 30 may be configured to decode the syntax elements to determine the coding mode(s) to use to decode the luma block. In other examples, video decoder 30 may not receive syntax elements that explicitly indicate a particular coding mode. Rather, video decoder 30 may be configured to derive a particular coding mode for a luma block based on various video characteristics (e.g., block size, information from neighboring blocks, etc.) and a set of predetermined rules. In other examples, video decoder 30 may determine coding modes based on a combination of explicitly signaled syntax elements and predetermined rules.

In one example, video encoder 22 may optionally encode chroma blocks (e.g., a Cr block and/or a Cb block) using the same coding mode as a corresponding luma block. Rather than video encoder 22 simply signaling syntax elements and/or other information indicating the coding mode for the chroma blocks, video encoder 22 may signal a syntax element (e.g., a flag) that indicates to video decoder 30 to reuse any signaled or derived information for determining the coding mode(s) for the luma block as a predictor for the coding mode(s) of one or more corresponding chroma blocks. For example, a flag may be coded for one or more chroma blocks to indicate whether the chroma blocks are coded with the same coding mode as a corresponding luma block. If not, than video encoder 22 generates syntax elements indicating the coding mode for the chroma block independently, where video encoder 22 can take into account that the chroma mode is not equal to the luma mode. That is, video encoder 22 and video decoder may be able to determine that the coding mode for the chroma block is not the same as the coding mode for the luma block, and therefore, the coding mode for the luma block can be excluded as a possibility for the chroma block. In a further example, a separate context can be used to code the flag that indicates whether chroma component is coded using the same mode as the luma component.

In the example describe above, it is assumed video encoder 22 and video decoder 30 code the luma block first, followed by coding the one or more chroma blocks. In this example, luma information is already available when a chroma block is being coded. If video encoder 22 and video decoder 30 are configured to code the blocks in another order (e.g., a chroma block is coded first), then luma and chroma terms can be simply be swapped in the following examples.

In one example of the disclosure, video decoder 30 may be configured to receive a bitstream of encoded video data and store the encoded video data in a memory (e.g., storage media 28 of FIG. 1). The encoded video data may represent both partitioned luma blocks and partitioned chroma blocks. In some examples, the partitioned chroma blocks may include both Cr chroma blocks and Cb chroma blocks. As used in the disclosure, the term "chroma block" may refer to any type of block that includes any type of chroma information. In the examples of this disclosure, the chroma blocks are partitioned independently of the luma blocks. That is, video encoder 22 may be configured to encode the video data using a separate partitioning structure for luma blocks and chroma blocks.

Such a separate partitioning structure may result in at least one partitioned chroma block not being aligned with a single partitioned luma block. As such, for a particular spatial location of a picture, video encoder 22 may partition a single chroma block, but partition multiple luma blocks. However, it should be understood that for other spatial locations of the picture, there may be a 1 to 1 correspondence between luma and chroma blocks, or there may be multiple chroma blocks for a single luma block. The QTBT partitioning structure described above is a type of partitioning structure where luma and chroma blocks are partitioned independently/separately. However, the techniques of this disclosure may be applied to video data partitioned according to any partitioning structure where luma and chroma blocks are partitioned independently.

Video decoder 30 may be further configured to determine a coding mode for the respective partitioned luma blocks received in the encoded video bitstream and decode the respective partitioned luma blocks according the determined respective coding modes. Video decoder 30 may be configured to determine the coding mode from information indicated by syntax elements received in the encoded video bitstream. Such syntax elements may indicate the coding modes explicitly. In other examples, video decoder 30 may be configured to implicitly determine the coding mode for the luma blocks from characteristics of the video data and some predetermined rules. In other examples, video decoder 30 may determine the coding modes for the luma blocks using a combination of explicitly signaled syntax elements and implicitly determined coding modes from predetermined rules and video data characteristics.

In the context of this disclosure, the coding modes can be any information that indicates to video decoder 30 how video encoder 22 encoded the encoded video data, and how video decoder 30 should decode the video data. Example coding modes may include direct mode for chroma intra prediction, a position-dependent intra prediction combination (PDPC) flag (e.g., indicating if a PDPC mode is used), PDPC parameters, secondary transform sets for a non-separable secondary transforms (NSST), enhanced multiple transform (EMT), adaptive multiple transforms (AMT), and contexts for selecting entropy coding data models. The above are examples of chroma coding modes that can be derived from the luma coding modes (coding modes used to code luma blocks) determined by video decoder 30, and which have been used in the JEM test model studied in JVET. However, it should be understood that the coding modes may include any coding mode used for coding the luma blocks that may be reused for coding chroma blocks or used to predict the coding mode for a chroma block.

Regardless of the type of coding mode, or the manner in which the coding mode was determined, video decoder 30 may be configured to store the determined coding mode for a particular partitioned luma blocks in a plurality of different memory locations associated with the particular partitioned luma block. As will be explained in more detail below with reference to FIG. 3, a particular partitioned luma block may be divided into sub-blocks, and video decoder 30 may store the coding mode determined for the entire particular partitioned luma block in memory locations corresponding to each of the sub-blocks. Accordingly, for a particular partitioned luma block divided into N sub-blocks, the coding mode is stored in N different memory locations, each memory location corresponding to a particular spatially located sub-block within the partitioned luma block. Sub-blocks can be a rectangular or square block of any size. In some examples, a sub-block may be just one sample, i.e., a block of size of 1×1. In some examples, each memory location may store data that explicitly indicates the coding mode for the particular partitioned luma block. In other examples, one or more memory location associated with the particular partitioned luma block explicitly stores information indicating the coding mode, while the other memory locations associated with the particular partitioned luma block store pointers to the memory location(s) that explicitly stores the coding mode.

According to some examples of the disclosure, video decoder 30 may be configured to reuse coding mode information received for a luma block for use when decoding a chroma block. In some examples, video decoder 30 may receive and decode a first syntax element indicating if coding modes associated with the respective partitioned luma blocks are to be used for decoding a particular partitioned chroma block. As described above, a partitioned chroma block may be spatially aligned with two or more different partitioned luma blocks. As such, it may be difficult to determine how to reuse luma coding modes for such a chroma block, as it is unclear from which luma block to inherit (e.g., reuse) the coding mode information. By storing the luma coding mode information in multiple memory locations corresponding to multiple sub-block locations, video decoder 30 may be configured to determine which coding mode information from the luma block to reuse for a particular chroma block using a function of the coding mode information stored for sub-blocks that correspond to the spatial location of the particular chroma block. In this context, the function may be a set of predetermined rules and analysis techniques that video decoder 30 uses to determine which coding mode(s) of the two or more co-located partitioned luma blocks to reuse for the partitioned chroma block. Once the luma coding mode to reuse is determined, video decoder 30 may decode the particular partitioned chroma block with the determined coding mode.

Video decoder 30 may be configured to determine which coding mode to reuse from two or more spatially aligned luma blocks based on a function of coding mode information stored in memory locations associated with sub-blocks of the partitioned luma blocks. Several different functions may be used. In one example of the disclosure, video decoder 30 may be configured to perform a statistical analysis of the luma coding mode information corresponding to the two or more luma partitions that are collocated with chroma partition. The determined luma coding mode information from the luma block for use by the chroma block may be a function of the whole luma coding mode information (e.g., the coding mode information contained in every luma sub-block that is co-located with the chroma block) and how luma coding mode information varies (e.g., to what extent the information is similar or different) across the co-located sub-blocks in the luma block. One difference from the previous techniques for coding mode reuse and the techniques of this disclosure, is that the luma coding mode information can be related to more than one luma block (or partition) due to the separate luma and chroma partitioning.

Examples of a function that may be used for determining what luma coding mode information from two or more partitioned luma blocks can be reused for a co-located chroma block may include, but is not limited to, one or more of the functions described below. In one example, video decoder 30 may perform a function that includes a statistical analysis of the coding mode information indicating the determined respective coding mode of two or more partitioned luma blocks. The coding mode information is stored in respective memory locations associated with the respective sub-blocks of the two or more partitioned luma blocks. In one example, video decoder 30 may analyze the coding mode information and return (e.g., to determine to use and obtain from memory) the coding mode information that appears most often for the co-located sub-blocks of the two or more partitioned luma blocks. That is, the function returns the majority of the luma information used in the corresponding luma blocks. In this manner, the function indicates that particular luma coding mode information, from two or more partitioned luma blocks, to be reused for a co-located chroma block.

In other examples, video decoder 30 may use a function performs an analysis of the coding mode information for the sub-blocks of the two or more partitioned luma blocks, the analysis includes measuring the gradient or higher derivatives of the luma coding mode information to measure the smoothness of that information. For example, some extreme (e.g., outlier) coding mode information in the two or more luma blocks, which may be much different from the majority of the coding mode information related to the two or more luma blocks, can be ignored and not reused for the chroma blocks. In other examples, video decoder 30 may assign different weights to the luma coding mode information stored for respective sub-blocks, and use a weighted average of coding modes to determine which mode to reuse for the chroma block. The weights may be assigned based on the relative locations of the luma sub-blocks that are co-located with the chroma block.

In other examples, the functions used to determine what luma coding mode(s) to reuse for a chroma block may include one or more of the following video coding characteristics. The functions video decoder 30 may use to determine what luma coding mode(s) to reuse for a chroma block may include the shape of the block (rectangular, square), a block orientation (vertical or horizontal oriented rectangular block), a shape of the chroma block, a shape of the luma block containing representative location, the width or height of the luma and/or chroma blocks, more frequently used luma mode of the area corresponding to the chroma block. In other examples, the function may be based on the prediction mode or luma information in the representative location. For example, if video decoder 30 is configured to reuse a luma intra mode for a chroma block, but the luma block in the representative location is coded with an inter mode, video decoder 30 may configured to select another representative location to determine the luma intra mode to reuse for the chroma block. More generally, if video decoder 30 is determine what luma information to reuse to code a chroma block, but the luma information may not be valid for this chroma block, video decoder 30 may consider luma information from another representative location in the luma block, or otherwise may use some default luma information.

In another example of the disclosure, video decoder 30 may reuse coding mode information based on a predetermined sub-block location. For example, video decoder 30 may simply reuse the coding mode information stored for a particular sub-block location that is co-located with the chroma block. As one example, video decoder 30 may reuse coding mode information stored at a luma sub-block that is co-located with a particular corner of the partitioned chroma block. Any corner sub-block may be used. As another example, video decoder 30 may reuse coding mode information stored at a luma sub-block that is co-located with a center of the partitioned chroma block. In other examples, video decoder 30 may perform a statistical analysis (e.g., as described above) of the coding mode information stored for some predetermined number of luma sub-block locations. That is, video decoder 30 may use a function that analyzes certain sub-blocks of a luma partition and derives chroma information based on the luma information contained therein.

In another example, video decoder 30 may divide the partitioned chroma block into multiples of sub-blocks, e.g., 1×1, 2×2, 4×4, or other sized sub-blocks. Then, for each sub-block, video decoder 30 may inherit (e.g., reuse) the luma coding mode information stored for a particular luma sub-block for a co-located chroma sub-block. In this way, different coding information from the corresponding luma block can be applied in a single chroma block.

As discussed above, video decoder 30 may use one of a plurality of predetermined functions for determining how to reuse luma coding mode information for chroma blocks. In some examples, video decoder 30 may be configured to use a single predetermined function, and use that function for all pictures. In other examples, video decoder 30 may determine which function to use based on some video coding characteristics. In other examples, video encoder 22 may be configured to signal a syntax element that indicates to video decoder 30 what function to use to determine how to reuse luma coding mode information. Such a syntax element may be signaled at any level, e.g., a sequence level, a picture level, a slice level, a tile level, a CTB level, etc.

Figure 3:
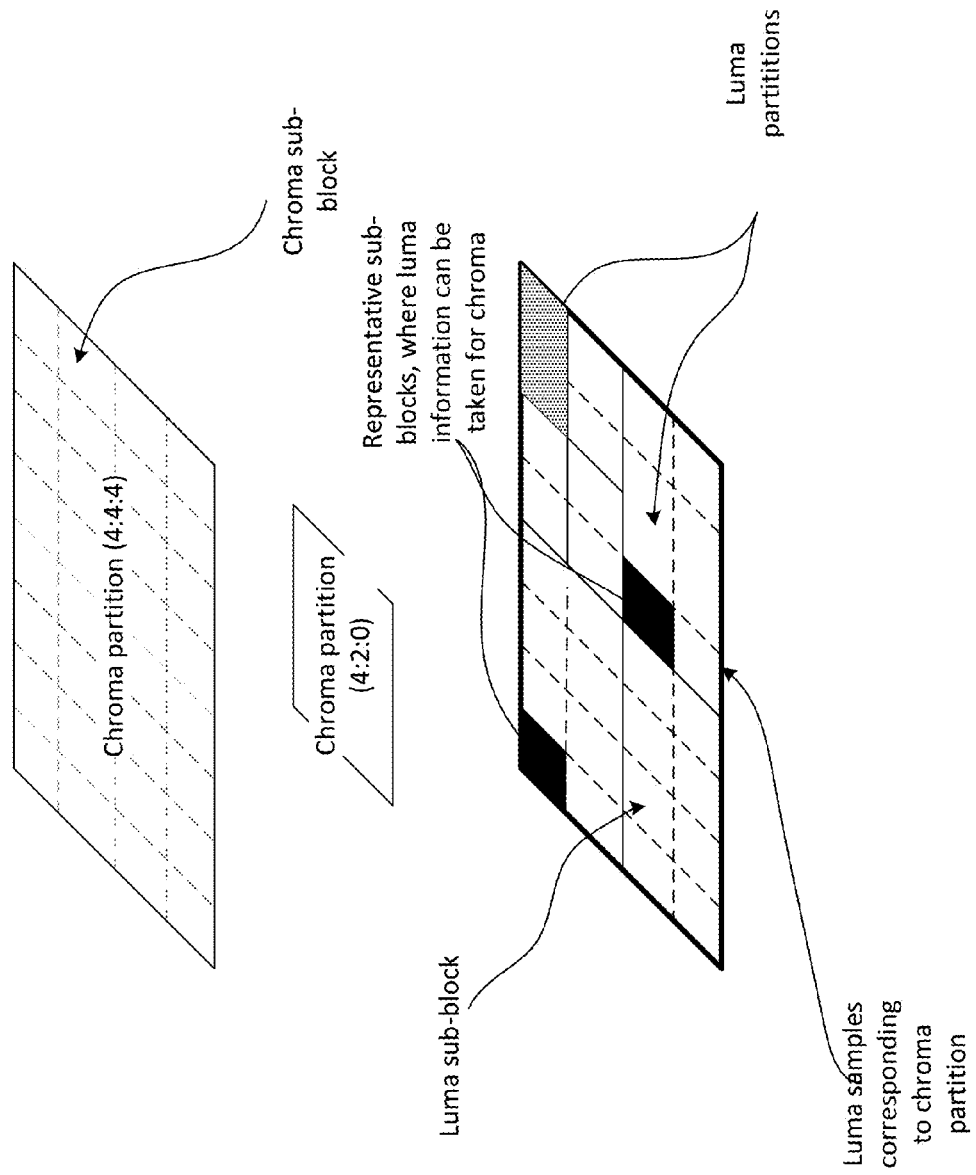
FIG. 3 is a conceptual diagram illustrating an example of luma and chroma relative partitioning in accordance with the techniques of this disclosure.

FIG. 3 is a conceptual diagram illustrating an example of luma and chroma relative partitioning in accordance with the techniques of this disclosure. As shown in FIG. 3, information is stored per partition (e.g., partitioned luma blocks) in sub-blocks of the partitions (dashed boxes). The sub-blocks may be of any size, down to the size of an individual sample. FIG. 3 shows that one chroma partition, whether in a 4:4:4 or 4:2:0 sub-sampling format, may have more than one associated luma partition. As such, a single chroma partition may have more than one corresponding set of luma information. Certain representative locations (e.g., sub-blocks) of the luma partitions may be used to analyze the luma information (e.g., coding modes) so as to derive the chroma information for the corresponding chroma partition, as described above.

Figure 4:
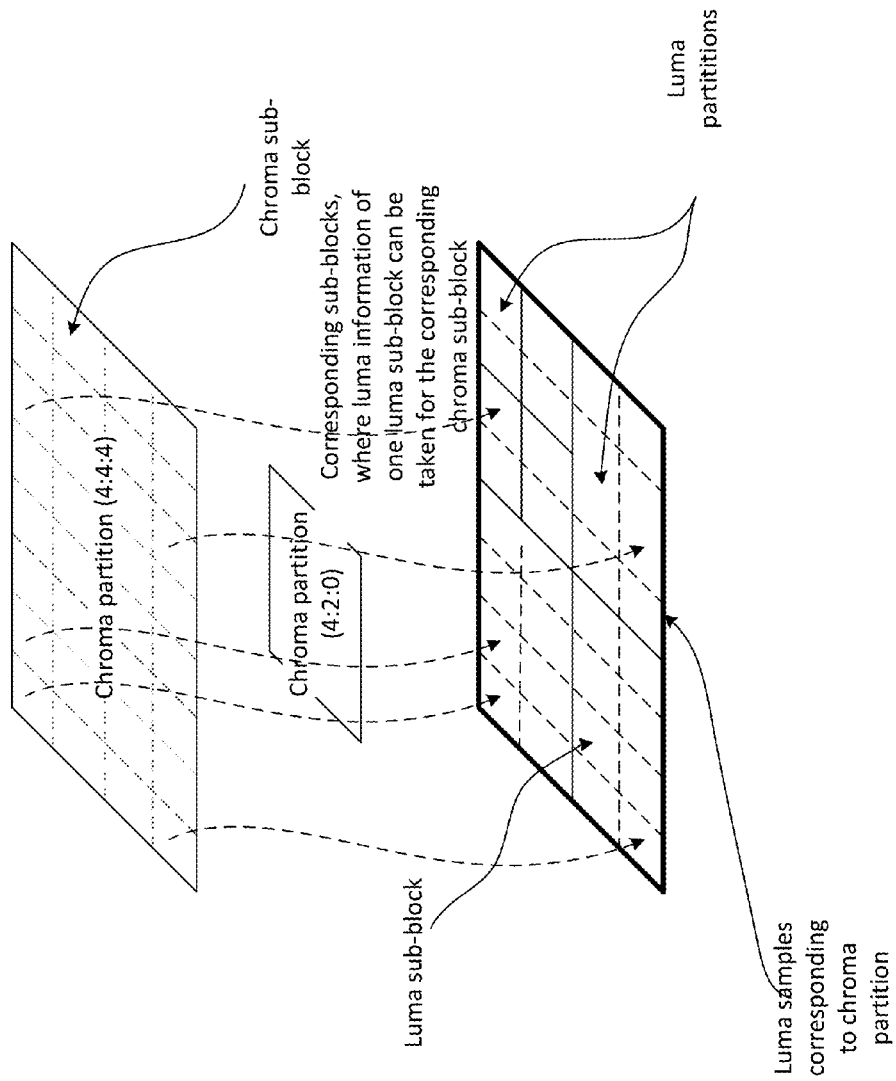
FIG. 4 is a conceptual diagram illustrating another example of luma and chroma relative partitioning in accordance with the techniques of this disclosure.

FIG. 4 is a conceptual diagram illustrating another example of luma and chroma relative partitioning in accordance with the techniques of this disclosure. As shown in FIG. 4, information is stored per partition in sub-blocks (dashed boxes) of the luma partition. FIG. 4 shows that each sub-block in one chroma partition may have one associated luma sub-block, and the luma information of the associated one luma sub-block can be analyzed to derive the chroma information for the corresponding chroma sub-block.

The following section describes some examples that may use the techniques of the disclosure. In chroma direct mode, the luma intra direction is used for chroma intra prediction. An example of this mode was used in HEVC. In accordance with one example technique of this disclosure, when the chroma and luma structure is not aligned (e.g., due to independent chroma and luma partitioning), the center representative luma sub-block is selected to obtain the luma intra prediction mode, which is then applied for the chroma partition as the direct mode. Other luma sub-blocks of the corresponding luma partition may have other intra directions different from the selected sub-block. Other functions instead of using the center representative sub-block, as explained above, may also be used.

In another example, in chroma direct mode, when the chroma and luma structure is not aligned, the chroma intra prediction is performed in 2×2 (or 4×4) sub-block units. For each 2×2 (or 4×4) chroma sub-block, one associated 4×4 luma sub-block is identified, and the intra prediction mode of this identified 4×4 luma sub-block is applied for the current chroma 2×2 (or 4×4) sub-block.

In another example, a chroma PDPC control flag (i.e., PDPC mode is applied or not) and PDPC parameters are derived, for example, from the center representative luma sub-block, and applied for the chroma partition. Other functions instead of using the center representative sub-block, as explained above, may also be used.

In another example, a secondary transform (NSST) set is selected by video decoder 30 from the center representative luma sub-block and is applied for the chroma partition. Other functions instead of using the center representative sub-block, as explained above, may also be used.

Similar techniques may be applied by video decoder 30 to any chroma information that is derived from luma information.

The foregoing examples were described with reference to video decoder 30. However, video encoder 22 may employ the same techniques for determining how to reuse information generated, derived, and/or signaled for luma blocks for chroma blocks. In particular, video encoder 22 may determine whether or not to signal a syntax element that indicates whether or not luma coding mode information should be reused for chroma blocks based on the function the video decoder will use to determine what luma coding mode information to reuse.

The following sections describes techniques for determining parameters for a position-dependent intra prediction combination (PDPC) coding mode for blocks of video data that may be partitioned into non-square, rectangular partitions. The QTBT partitioning structure described above is an example of a partitioning structure that allows for non-square, rectangular blocks. However, the techniques of this disclosure may be used with any partitioning structure that produces non-square, rectangular blocks.

When coding video data using the PDPC coding mode, video encoder 22 and/or video decoder 30 may use one or more parameterized equations that define how to combine predictions based on filtered and unfiltered reference values and based on the position of the predicted pixel. The present disclosure describes several sets of parameters, such that video encoder 22 may be configured to test the sets of parameters (via, e.g., using rate-distortion analysis) and signal to video decoder 30 the optimal parameters (e.g., the parameters resulting in the best rate-distortion performance among those parameters that are tested). In other examples, video decoder 30 may be configured to determine PDPC parameters from characteristics of the video data (e.g., block size, block height, block width, etc.).

Figure 5B:
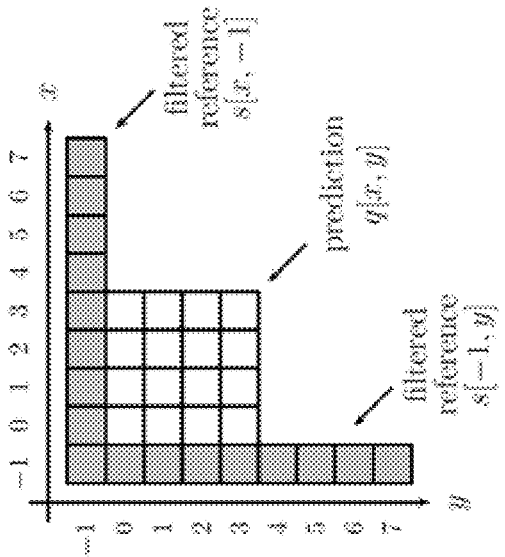
FIG. 5B illustrates a prediction of a 4×4 block using a filtered reference according to techniques of this disclosure.
Figure 5A:
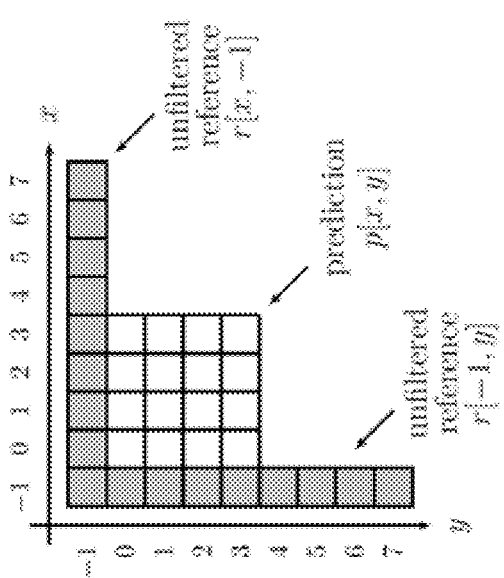
FIG. 5A illustrates a prediction of a 4×4 block using an unfiltered reference according to techniques of this disclosure.

FIG. 5A illustrates a prediction of a 4×4 block (p) using an unfiltered reference (r) according to techniques of the present disclosure. FIG. 5B illustrates a prediction of a 4×4 block (q) using a filtered reference (s) according to techniques of the present disclosure. While both FIGS. 5A and 5B illustrate a 4×4 pixel block and 17 (4×4+1) respective reference values, the techniques of the present disclosure may be applied to any block size and number of reference values.

Video encoder 22 and/or video decoder 30, when performing the PDPC coding mode, may utilize a combination between the filtered (q) and unfiltered (p) predictions, such that a predicted block for a current block to be coded can be computed using pixel values from both the filtered (s) and unfiltered (r) reference arrays.

In one example of the techniques of PDPC, given any two set of pixel predictions $p_r[x, y]$ and $q_s[x, y]$, computed using only the unfiltered and filtered references r and s, respectively, the combined predicted value of a pixel, denoted by v[x, y], is defined by $$v[x,y]=c[x,y]p_r[x,y]+(1-c[x,y])q_s[x,y] \quad (1)$$

where c[x, y] is the set of combination parameters. The value of the weight c[x, y] may be a value between 0 and 1. The sum of the weights c[x, y] and (1−c[x, y]) may be equal to one.

In certain examples it may not be practical to have a set of parameters as large as the number of pixels in the block. In such examples c[x, y] may be defined by a much smaller set of parameters, plus an equation to compute all combination values from those parameters. In such an example the following formula may be used:

$$v[x, y] = \left\lfloor \frac{c_1^{(v)} r[x, -1] - c_2^{(v)} r[-1, -1]}{2^{\lfloor y/d_v \rfloor}} \right\rfloor + \left\lfloor \frac{c_1^{(h)} r[-1, y] - c_2^{(h)} r[-1, -1]}{2^{\lfloor x/d_h \rfloor}} \right\rfloor + \left( \frac{N - \min(x, y)}{N} \right) g p_r^{(HEVC)}[x, y] + b[x, y] q_s^{(HEVC)}[x, y] \quad (2)$$

where $c_1^v$, $c_2^v$, $c_1^h$, $c_2^h$, g, and $d_v$, $d_h \in \{1,2\}$, are prediction parameters, N is the block size, $p_r[x, y]$ and $q_s[x, y]$ are prediction values computed using the according to the HEVC standard, for the specific mode, using respectively the nonfiltered and filtered references, and $$b[x, y] = 1 - \left\lfloor \frac{c_1^{(v)} - c_2^{(v)}}{2^{\lfloor y/d_v \rfloor}} \right\rfloor - \left\lfloor \frac{c_1^{(h)} - c_2^{(h)}}{2^{\lfloor x/d_h \rfloor}} \right\rfloor - \left( \frac{N - \min(x, y)}{N} \right) g \quad (3)$$

is a normalization factor (i.e., to make the overall weights assigned to $p_r^{(HEVC)}[x, y]$ and $q_s^{(HEVC)}[x, y]$ add to 1), defined by the prediction parameters.

Formula 2 may be generalized for any video coding standard in formula 2A:

$$v[x, y] = \quad (2A)$$

-continued $$\left\lfloor \frac{c_1^{(v)}r[x,-1] - c_2^{(v)}r[-1,-1]}{2^{\lfloor y/d_v \rfloor}} \right\rfloor + \left\lfloor \frac{c_1^{(h)}r[-1,y] - c_2^{(h)}r[-1,-1]}{2^{\lfloor x/d_h \rfloor}} \right\rfloor +$$

$$\left(\frac{N - \min(x,y)}{N}\right) g p_r^{(STD)}[x,y] + b[x,y] q_s^{(STD)}[x,y] \qquad (5)$$

where $c_1^v$, $c_2^v$, $c_1^h$, $c_2^h$, g, and $d_v$, $d_h \in \{1,2\}$, are prediction parameters, N is the block size, $p_r^{(STD)}[x, y]$ and $q_s^{(STD)}[x, y]$ are prediction values computed using the according to a video coding standard (or video coding scheme or algorithm), for the specific mode, using respectively the nonfiltered and filtered references, and $$b[x,y] = 1 - \left\lfloor \frac{c_1^{(v)} - c_2^{(v)}}{2^{\lfloor y/d_v \rfloor}} \right\rfloor - \left\lfloor \frac{c_1^{(h)} - c_2^{(h)}}{2^{\lfloor x/d_h \rfloor}} \right\rfloor - \left(\frac{N - \min(x,y)}{N}\right) g \qquad (3A)$$

is a normalization factor (i.e., to make the overall weights assigned to $p_r^{(STD)}[x, y]$ and $q_s^{(STD)}[x, y]$ add to 1), defined by the prediction parameters.

These prediction parameters may include weights to provide an optimal linear combination of the predicted terms according to the type of prediction mode used (e.g., DC, planar, and 33 directional modes of HEVC). For example, HEVC contains 35 prediction modes. A lookup table may be constructed with values for each of the prediction parameters $c_1^v$, $c_2^v$, $c_1^h$, $c_2^h$, g, $d_v$, and $d_h$ for each of the prediction modes (i.e., 35 values of $c_1^v$, $c_2^v$, $c_1^h$, $c_2^h$, g, $d_v$, and $d_h$ for each prediction mode). Such values may be encoded in a bitstream with the video or may be constant values known by the encoder and decoder ahead of time and may not need to be transmitted in a file or bitstream. The values for $c_1^v$, $c_2^v$, $c_1^h$, $c_2^h$, g, $d_v$, and $d_h$ may be determined by an optimization training algorithm by finding the values for the prediction parameters that give best compression for a set of training videos.

In another example, there are a plurality of predefined prediction parameter sets for each prediction mode (in e.g. a lookup table) and the prediction parameter set selected (but not the parameters themselves) is transmitted to a decoder in an encoded file or bitstream. In another example the values for $c_1^v$, $c_2^v$, $c_1^h$, $c_2^h$, g, $d_v$, and $d_h$ may be generated on the fly by a video encoder and transmitted to a decoder in an encoded file or bitstream.

In another example, instead of using HEVC prediction, a video coding device performing these techniques may use a modified version of HEVC, like one that uses 65 directional predictions instead of 33 directional predictions. In fact, any type of intra-frame prediction can be used.

In another example, the formula can be chosen to facilitate computations. For example, we can use the following type of predictor $$v[x,y] = \left\lfloor \frac{c_1^{(v)}r[x,-1] - c_2^{(v)}r[-1,-1]}{2^{\lfloor y/d_v \rfloor}} \right\rfloor + \qquad (4)$$

$$\left\lfloor \frac{c_1^{(h)}r[-1,y] - c_2^{(h)}r[-1,-1]}{2^{\lfloor x/d_h \rfloor}} \right\rfloor + b[x,y] p_{a,r,s}^{(HEVC)}[x,y]$$

where $$b[x,y] = 1 - \left\lfloor \frac{c_1^{(v)} - c_2^{(v)}}{2^{\lfloor y/d_v \rfloor}} \right\rfloor - \left\lfloor \frac{c_1^{(h)} - c_2^{(h)}}{2^{\lfloor x/d_h \rfloor}} \right\rfloor \qquad (5)$$

and $$p_{a,r,s}^{(HEVC)}[x,y] = a p_r^{(HEVC)}[x,y] + (1-a) q_s^{(HEVC)}[x,y]. \qquad (6)$$

Such an approach may exploit the linearity of the HEVC (or other) prediction. Defining h as the impulse response of a filter k from a predefined set, if we have $$s = ar + (1-a)(h * r) \qquad (7)$$

where "*" represents convolution, then $$p_{a,r,s}^{(HEVC)}[x,y] = p_s^{(HEVC)}[x,y] \qquad (8)$$

i.e., the linearly combined prediction may be computed from the linearly combined reference.

Formulas 4, 6 and 8 may be may be generalized for any video coding standard in formula 4A, 6A, and 8A:

$$v[x,y] = \left\lfloor \frac{c_1^{(v)}r[x,-1] - c_2^{(v)}r[-1,-1]}{2^{\lfloor y/d_v \rfloor}} \right\rfloor + \qquad (4A)$$

$$\left\lfloor \frac{c_1^{(h)}r[-1,y] - c_2^{(h)}r[-1,-1]}{2^{\lfloor x/d_h \rfloor}} \right\rfloor + b[x,y] p_{a,r,s}^{(STD)}[x,y]$$

where $$b[x,y] = 1 - \left\lfloor \frac{c_1^{(v)} - c_2^{(v)}}{2^{\lfloor y/d_v \rfloor}} \right\rfloor - \left\lfloor \frac{c_1^{(h)} - c_2^{(h)}}{2^{\lfloor x/d_h \rfloor}} \right\rfloor \qquad (5A)$$

and $$p_{a,r,s}^{(STD)}[x,y] = a p_r^{(STD)}[x,y] + (1-a) q_s^{(STD)}[x,y]. \qquad (6A)$$

Such an approach may exploit the linearity of the prediction of the coding standard. Defining h as the impulse response of a filter k from a predefined set, if we have $$s = ar + (1-a)(h * r) \qquad (7A)$$

where "*" represents convolution, then $$p_{a,r,s}^{(STD)}[x,y] = p_s^{(STD)}[x,y] \qquad (8A)$$

i.e., the linearly combined prediction may be computed from the linearly combined reference.

In an example, prediction functions may use the reference vector (e.g., r and s) only as input. In this example, the behavior of the reference vector does not change if the reference has been filtered or not filtered. If r and s are equal (e.g., some unfiltered reference r happens to be the same as another filtered reference s) then predictive functions, e.g. $p_r[x, y]$ (also written as p(x,y,r)) is equal to $p_s[x, y]$ (also written as p(x,y,s))), applied to filtered and unfiltered references are equal. Additionally, pixel predictions p and q may be equivalent (e.g., produce the same output given the same input). In such an example, formulas (1)-(8) may be rewritten with pixel prediction p[x, y] replacing pixel prediction q[x, y].

In another example, the prediction (e.g., the sets of functions) may change depending on the information that a reference has been filtered. In this example, different sets of functions can be denoted (e.g., $p_r[x, y]$ and $q_s[x, y]$). In this case, even if r and s are equal, $p_r[x, y]$ and $q_s[x, y]$ may not be equal. In other words, the same input can create different output depending on whether the input has been filtered or not. In such an example, p[x, y] may not be able to be replaced by q[x, y].

An advantage of the prediction equations shown is that, with the parameterized formulation, sets of optimal parameters can be determined (i.e., those that optimize the prediction accuracy), for different types of video textures, using techniques such as training. This approach, in turn, may be extended in some examples by computing several sets of predictor parameters, for some typical types of textures, and having a compression scheme where the encoder test predictors from each set, and encodes as side information the one that yields best compression.

In some example of the techniques described above, when the PDPC coding mode is enabled, PDPC parameters used for intra prediction weighting and controlling, for example, using filtered or unfiltered samples, of PDPC mode are precomputed and stored in a look up table (LUT). In one example, video decoder 30 determines the PDPC parameters according to the block size and intra prediction direction. Previous techniques for PDPC coding mode assumed that intra predicted blocks are always square in size.

The JVET test model includes the PDPC coding mode. As discussed above, the JVET test model uses QTBT partitioning, which allows for non-square rectangular blocks. The following section discusses example techniques for the extension of PDPC coding for rectangular blocks. However, it should be understood that the techniques of this disclosure may be used for determining prediction mode parameters for any prediction mode that uses non-square blocks, including prediction modes that apply a weighted average to the predictor and reference samples according to sample position.

It is suggested to modify the structure of the LUT used for determining PDPC parameters, or the techniques used for deriving parameters from the LUT, in a way that for horizontal-related parameters, the width of the block is used to store or access PDPC parameters from the LUT, and for vertical-related parameters, the height of the block is used to store or access PDPC parameters from the LUT. For other parameters that do not have horizontal or vertical relation, a function of the block width and height can be applied to store or access those parameters from the LUT.

Video decoder 30 may receive a block of video data that has been encoded using the PDPC mode. In this example, the block of video data may have a non-square, rectangular shape defined by a width and a height. Video decoder 30 may determine horizontally-related PDPC parameters as a function of the intra prediction mode and the width of the block. Video decoder 30 may determine vertically-related PDPC parameters as a function of the intra prediction mode and the height of the block. In addition, video decoder 30 may determine non-directional PDPC parameters (e.g., PDPC parameters that are neither horizontally-related nor vertically-related) based on the intra prediction mode and a function of the height and width of the block. Example vertically-related parameters are indicated above with a superscript v. Example horizontally-related parameters are indicated above with a superscript h. The function, for example can be, but is not limited to, the max or min of width and height of the block, or a weighted average of the height and width of the block, where the weighting can be dependent on how one dimension is larger than another dimension of the block. For example, the larger dimension (width or height) can have a larger weight than the other dimension in the weighted average.

Since there are only a certain number of block shapes (width and height) that are allowed, this function can also be represented explicitly for all possible block widths and heights, or sub-combinations. For example, if we have $N_w$ and $N_h$ possible block widths and heights, tables of size $N_w \times N_h$ can store the data to be used in the intra prediction process, for each rectangular or square block.

Figure 6:
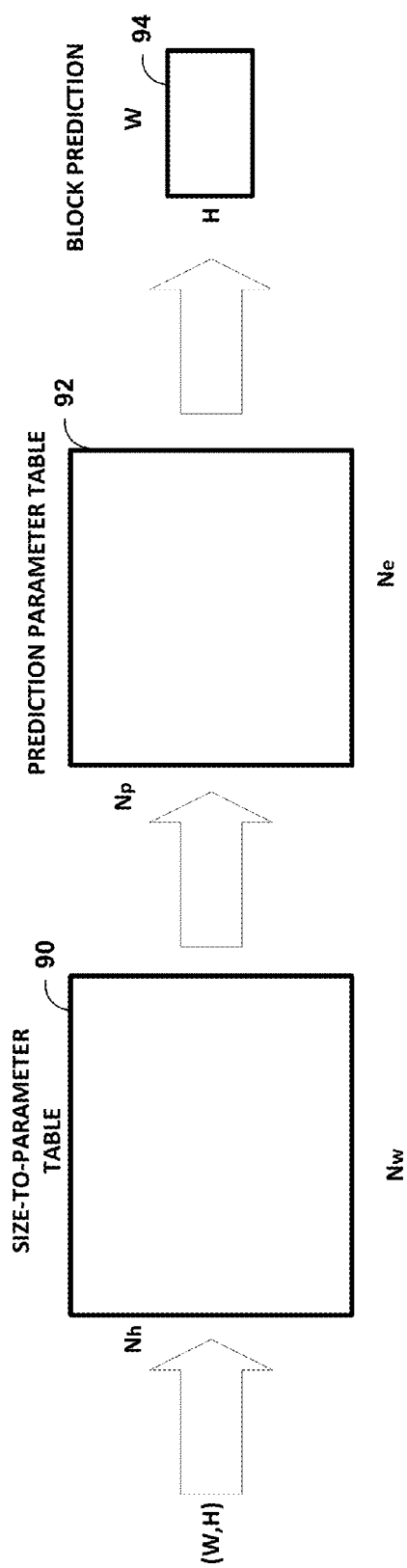
FIG. 6 is a conceptual diagram illustrating the use of nested tables for determining a set of prediction parameters used in a rectangular block in accordance with one example of the disclosure.

FIG. 6 is a conceptual diagram illustrating the use of nested tables for determining a set of prediction parameters used in a rectangular block in accordance with one example of the disclosure. Video decoder 30 may determine the PDPC parameters using one or more LUTs whose entries are indexed on both the width and height of a block. As shown in FIG. 6, the width (W) and/or height (H) may be used as inputs to size-to-parameter table 90. Size-to-parameter table 90 may be configured as a (LUT) that contains indices that point to entries in prediction parameter table 92. As discussed above, size-to-parameter table 90 may be of size $N_w \times N_h$ to account for $N_w$ and $N_h$ possible block widths and heights. In this example, size-to-parameter table 90 may be used for a single intra prediction mode (e.g., DC, planar, or other prediction directions). In other examples, size-to-parameter table 90 may contain entries for all intra prediction modes and use block height, block width, and intra prediction mode as entries in to the table. In general, to minimize memory, video decoder 30 and video encoder 22 may be configured to combine table entries in rows and columns, reducing the size of the tables (e.g., size-to-parameter table 90), and possibly creating several tables, of different sizes.

As one example, assuming a particular intra prediction mode, video decoder 30 may use the width of the block of video data being decoded to access an entry in size-to-parameter table 90 to determine one or more horizontally-related PDPC parameters. Based on the width of the block, the corresponding entry in size-to-parameter table 90 may be used as an input to prediction parameter table 92. Prediction parameter table 92 is of size $N_p \times N_e$ and contains entries of the actual PDPC parameters. As such, the entry obtained from size-to-parameter table 90 is an index that points to the actual horizontally-related PDPC parameter in prediction parameter table 92 that is then used in decoding block 94.

Likewise, video decoder 30 may use the height of the block of video data being decoded to access an entry in size-to-parameter table 90 to determine one or more vertically-related PDPC parameters. Based on the width of the block, the corresponding entry in size-to-parameter table 90 may be used as an input to prediction parameter table 92 to obtain the actual vertically-related PDPC parameter in prediction parameter table 92 that is then used in decoding block 94. The same process may be applied for non-directional PDPC parameters that are index based on a function of the height and width of the block.

Figure 7:
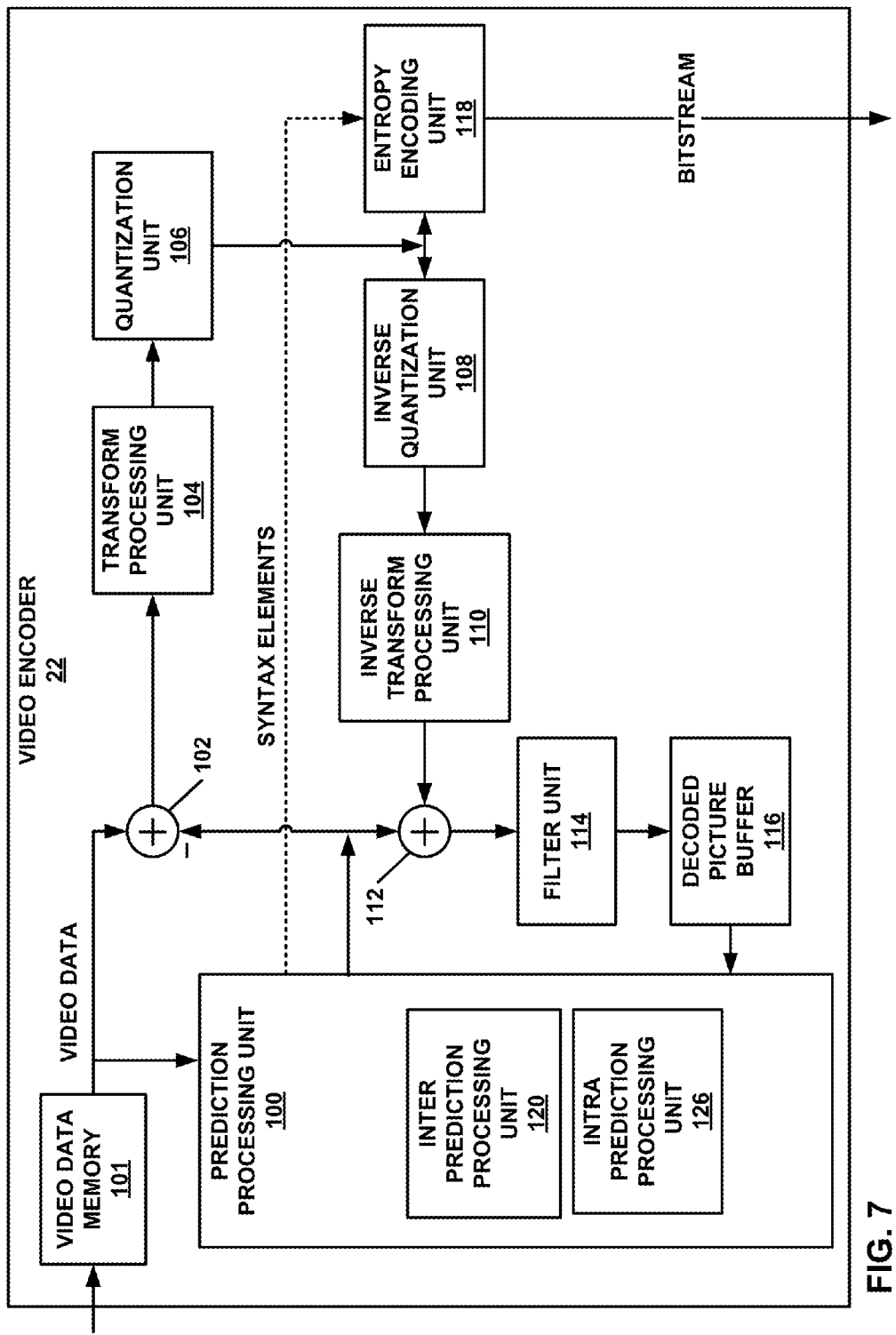
FIG. 7 is a block diagram illustrating an example of a video encoder configured to implement techniques of the disclosure.

FIG. 7 is a block diagram illustrating an example video encoder 22 that may implement the techniques of this disclosure. FIG. 7 is provided for purposes of explanation and should not be considered limiting of the techniques as broadly exemplified and described in this disclosure. The techniques of this disclosure may be applicable to various coding standards or methods.

In the example of FIG. 7, video encoder 22 includes a prediction processing unit 100, video data memory 101, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter prediction processing unit 120 and an intra prediction processing unit 126. Inter prediction processing unit 120 may include a motion estimation unit and a motion compensation unit (not shown).

Video data memory 101 may be configured to store video data to be encoded by the components of video encoder 22. The video data stored in video data memory 101 may be obtained, for example, from video source 18. Decoded picture buffer 116 may be a reference picture memory that stores reference video data for use in encoding video data by video encoder 22, e.g., in intra- or inter-coding modes. Video data memory 101 and decoded picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 101 and decoded picture buffer 116 may be provided by the same memory device or separate memory devices. In various examples, video data memory 101 may be on-chip with other components of video encoder 22, or off-chip relative to those components. Video data memory 101 may be the same as or part of storage media 20 of FIG. 1.

Video encoder 22 receives video data. Video encoder 22 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform partitioning to divide the CTBs of the CTU into progressively-smaller blocks. In some examples, video encoder 22 may partition blocks using a QTBT structure. The smaller blocks may be coding blocks of CUs. For example, prediction processing unit 100 may partition a CTB associated with a CTU according to a tree structure. In accordance with one or more techniques of this disclosure, for each respective non-leaf node of the tree structure at each depth level of the tree structure, there are a plurality of allowed splitting patterns for the respective non-leaf node and the video block corresponding to the respective non-leaf node is partitioned into video blocks corresponding to the child nodes of the respective non-leaf node according to one of the plurality of allowable splitting patterns.

Video encoder 22 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 22 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 22 and video decoder 30 may support PU sizes of 2N×2N or N×N for intra prediction, and symmetric PU sizes of 2N×2N, 2N×N, N×2N, N×N, or similar for inter prediction. Video encoder 22 and video decoder 30 may also support asymmetric partitioning for PU sizes of 2N×nU, 2N×nD, nL×2N, and nR×2N for inter prediction.

Inter prediction processing unit 120 may generate predictive data for a PU by performing inter prediction on each PU of a CU. The predictive data for the PU may include predictive blocks of the PU and motion information for the PU. Inter prediction processing unit 120 may perform different operations for a PU of a CU depending on whether the PU is in an I slice, a P slice, or a B slice. In an I slice, all PUs are intra predicted. Hence, if the PU is in an I slice, inter prediction processing unit 120 does not perform inter prediction on the PU. Thus, for blocks encoded in I-mode, the predicted block is formed using spatial prediction from previously-encoded neighboring blocks within the same frame. If a PU is in a P slice, inter prediction processing unit 120 may use uni-directional inter prediction to generate a predictive block of the PU. If a PU is in a B slice, inter prediction processing unit 120 may use uni-directional or bi-directional inter prediction to generate a predictive block of the PU.

Intra prediction processing unit 126 may generate predictive data for a PU by performing intra prediction on the PU. The predictive data for the PU may include predictive blocks of the PU and various syntax elements. Intra prediction processing unit 126 may perform intra prediction on PUs in I slices, P slices, and B slices.

To perform intra prediction on a PU, intra prediction processing unit 126 may use multiple intra prediction modes to generate multiple sets of predictive data for the PU. Intra prediction processing unit 126 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra prediction processing unit 126 may use various numbers of intra prediction modes, e.g., 33 directional intra prediction modes. In some examples, the number of intra prediction modes may depend on the size of the region associated with the PU. In addition, as will be described in more detail below with reference to FIG. 11, intra prediction processing unit 126 may be configured to determine PDPC parameters for encoding a block of video data as a function of a height and/or width of a block of video data.

Prediction processing unit 100 may select the predictive data for PUs of a CU from among the predictive data generated by inter prediction processing unit 120 for the PUs or the predictive data generated by intra prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the coding blocks (e.g., luma, Cb and Cr coding blocks) for a CU and the selected predictive blocks (e.g., predictive luma, Cb and Cr blocks) for the PUs of the CU, residual blocks (e.g., luma, Cb and Cr residual blocks) for the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quadtree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quadtree structure known as a "residual quadtree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 22 may adjust the degree of quantization applied to the coefficient blocks associated with a CU by adjusting the QP value associated with the CU. Quantization may introduce loss of information. Thus, quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 22 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter prediction processing unit 120 may use a reference picture that contains the reconstructed coding blocks to perform inter prediction on PUs of other pictures. In addition, intra prediction processing unit 126 may use reconstructed coding blocks in decoded picture buffer 116 to perform intra prediction on other PUs in the same picture as the CU.

Entropy encoding unit 118 may receive data from other functional components of video encoder 22. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a CABAC operation, a context-adaptive variable length coding (CAVLC) operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 22 may output a bitstream that includes entropy-encoded data generated by entropy encoding unit 118. For instance, the bitstream may include data that represents a RQT for a CU.

Figure 8:
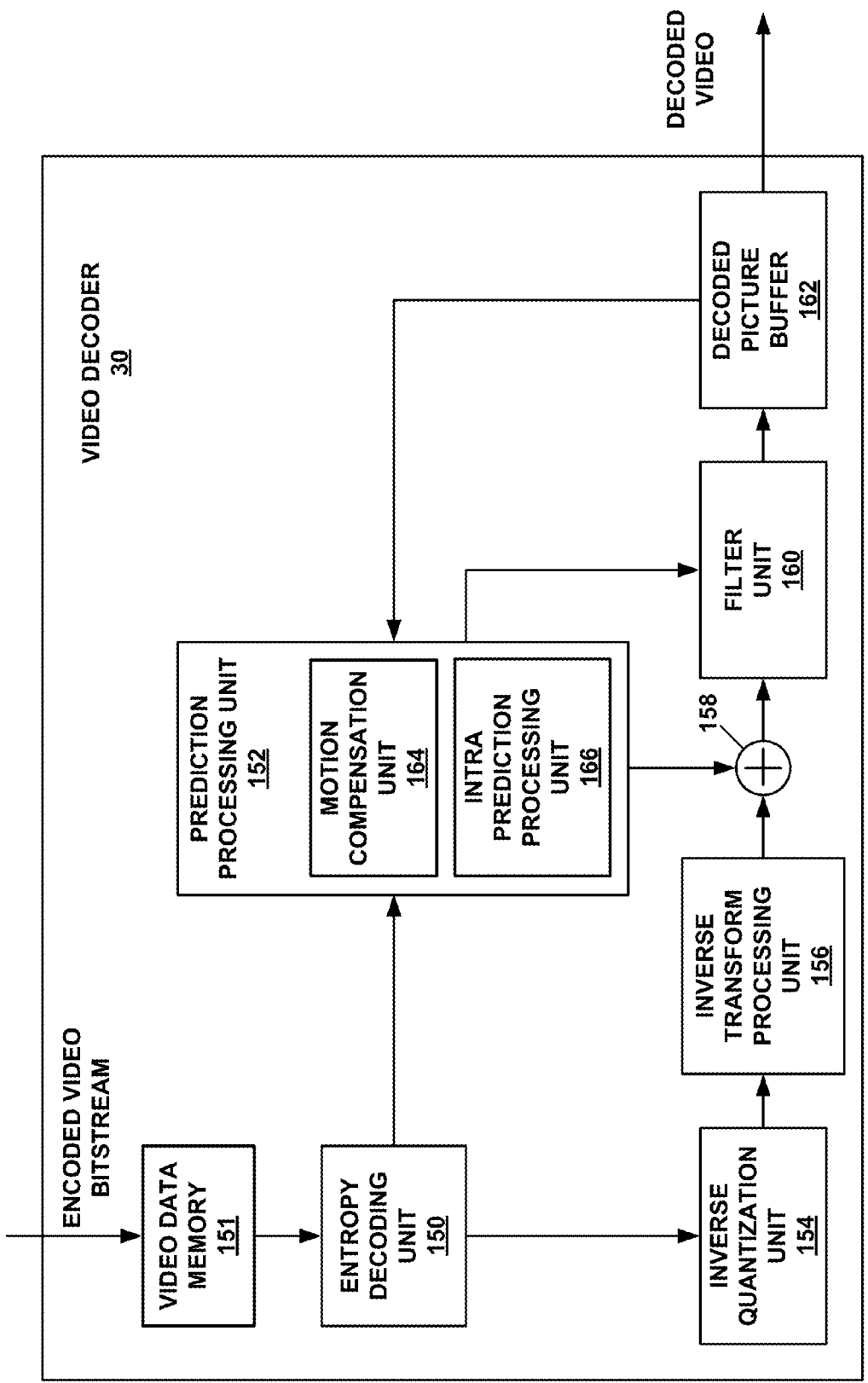
FIG. 8 is a block diagram illustrating an example of a video decoder configured to implement techniques of the disclosure.

FIG. 8 is a block diagram illustrating an example video decoder 30 that is configured to implement the techniques of this disclosure. FIG. 8 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods, including techniques that allow for non-square partitioning and/or independent luma and chroma partitioning.

In the example of FIG. 8, video decoder 30 includes an entropy decoding unit 150, video data memory 151, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra prediction processing unit 166. In other examples, video decoder 30 may include more, fewer, or different functional components.

Video data memory 151 may store encoded video data, such as an encoded video bitstream, to be decoded by the components of video decoder 30. The video data stored in video data memory 151 may be obtained, for example, from computer-readable medium 16, e.g., from a local video source, such as a camera, via wired or wireless network communication of video data, or by accessing physical data storage media. Video data memory 151 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-coding modes, or for output. Video data memory 151 and decoded picture buffer 162 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 151 and decoded picture buffer 162 may be provided by the same memory device or separate memory devices. In various examples, video data memory 151 may be on-chip with other components of video decoder 30, or off-chip relative to those components. Video data memory 151 may be the same as or part of storage media 28 of FIG. 1.

Video data memory 151 receives and stores encoded video data (e.g., NAL units) of a bitstream. Entropy decoding unit 150 may receive encoded video data (e.g., NAL units) from video data memory 151 and may parse the NAL units to obtain syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream. Entropy decoding unit 150 may perform a process generally reciprocal to that of entropy encoding unit 118.

In accordance with some examples of this disclosure, entropy decoding unit 150 may determine a tree structure as part of obtaining the syntax elements from the bitstream. The tree structure may specify how an initial video block, such as a CTB, is partitioned into smaller video blocks, such as coding units. In accordance with one or more techniques of this disclosure, for each respective non-leaf node of the tree structure at each depth level of the tree structure, there are a plurality of allowed splitting patterns for the respective non-leaf node and the video block corresponding to the respective non-leaf node is partitioned into video blocks corresponding to the child nodes of the respective non-leaf node according to one of the plurality of allowable splitting patterns.

In addition, as will be explained in more detail below with reference to FIG. 10, video decoder 30 may be configured to determine how to reuse coding mode information received for a luma block for use when decoding chroma blocks in situations where there are two or more luma blocks that correspond to a single chroma block.

In addition to obtaining syntax elements from the bitstream, video decoder 30 may perform a reconstruction operation on a non-partitioned CU. To perform the reconstruction operation on a CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra prediction processing unit 166 may perform intra prediction to generate predictive blocks of the PU. Intra prediction processing unit 166 may use an intra prediction mode to generate the predictive blocks of the PU based on samples spatially-neighboring blocks. Intra prediction processing unit 166 may determine the intra prediction mode for the PU based on one or more syntax elements obtained from the bitstream. In addition, as will be described in more detail below with reference to FIG. 12, intra prediction processing unit 166 may be configured to determine PDPC parameters for encoding a block of video data as a function of a height and/or width of a block of video data.

If a PU is encoded using inter prediction, entropy decoding unit 150 may determine motion information for the PU. Motion compensation unit 164 may determine, based on the motion information of the PU, one or more reference blocks. Motion compensation unit 164 may generate, based on the one or more reference blocks, predictive blocks (e.g., predictive luma, Cb and Cr blocks) for the PU.

Reconstruction unit 158 may use transform blocks (e.g., luma, Cb and Cr transform blocks) for TUs of a CU and the predictive blocks (e.g., luma, Cb and Cr blocks) of the PUs of the CU, i.e., either intra prediction data or inter prediction data, as applicable, to reconstruct the coding blocks (e.g., luma, Cb and Cr coding blocks) for the CU. For example, reconstruction unit 158 may add samples of the transform blocks (e.g., luma, Cb and Cr transform blocks) to corresponding samples of the predictive blocks (e.g., luma, Cb and Cr predictive blocks) to reconstruct the coding blocks (e.g., luma, Cb and Cr coding blocks) of the CU.

Filter unit 160 may perform a deblocking operation to reduce blocking artifacts associated with the coding blocks of the CU. Video decoder 30 may store the coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the blocks in decoded picture buffer 162, intra prediction or inter prediction operations for PUs of other CUs.

Figure 9:
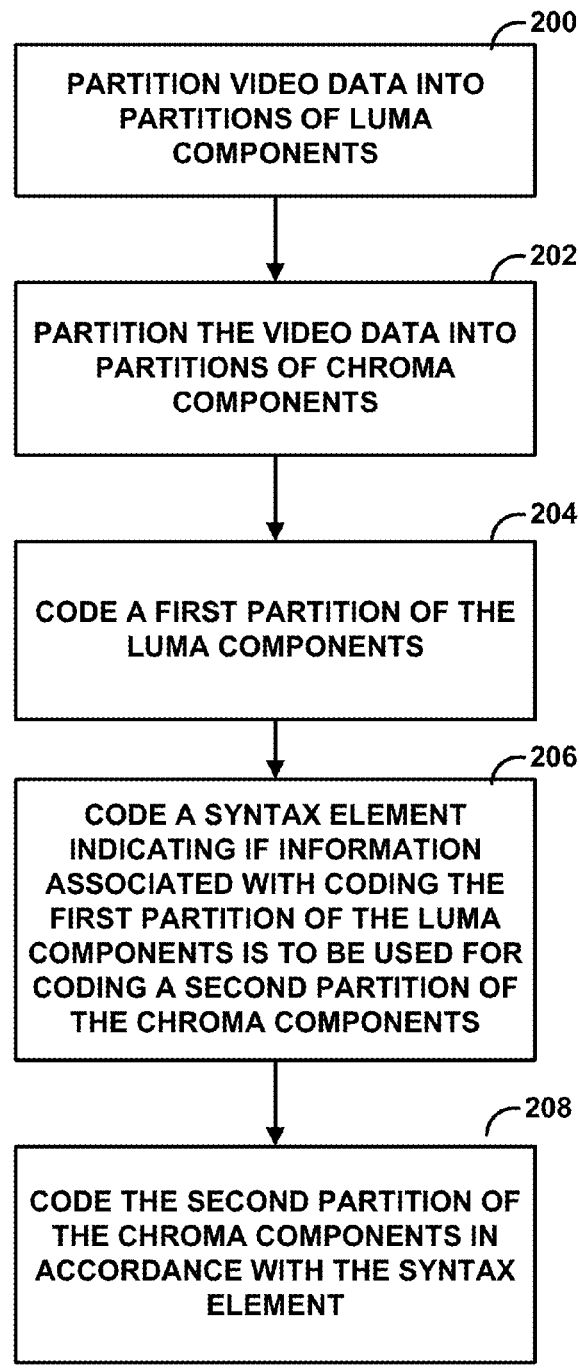
FIG. 9 is a flowchart illustrating an example operation of a video coder in accordance with a technique of this disclosure.

FIG. 9 is a flowchart illustrating an example operation of a video coder in accordance with a technique of this disclosure. The video coder may be video encoder 22 and/or video decoder 30. In accordance with the techniques of this disclosure, encoder 22 and/or video decoder 30 may be configured to partition video data into partitions of luma components (200), partition the video data into partitions of chroma components, wherein the chroma components are partitioned independently of the luma components (202), code a first partition of the luma components (204), code a syntax element indicating if information associated with coding the first partition of the luma components is to be used for coding a second partition of the chroma components (206), and code the second partition of the chroma components in accordance with the syntax element (208).

Figure 10:
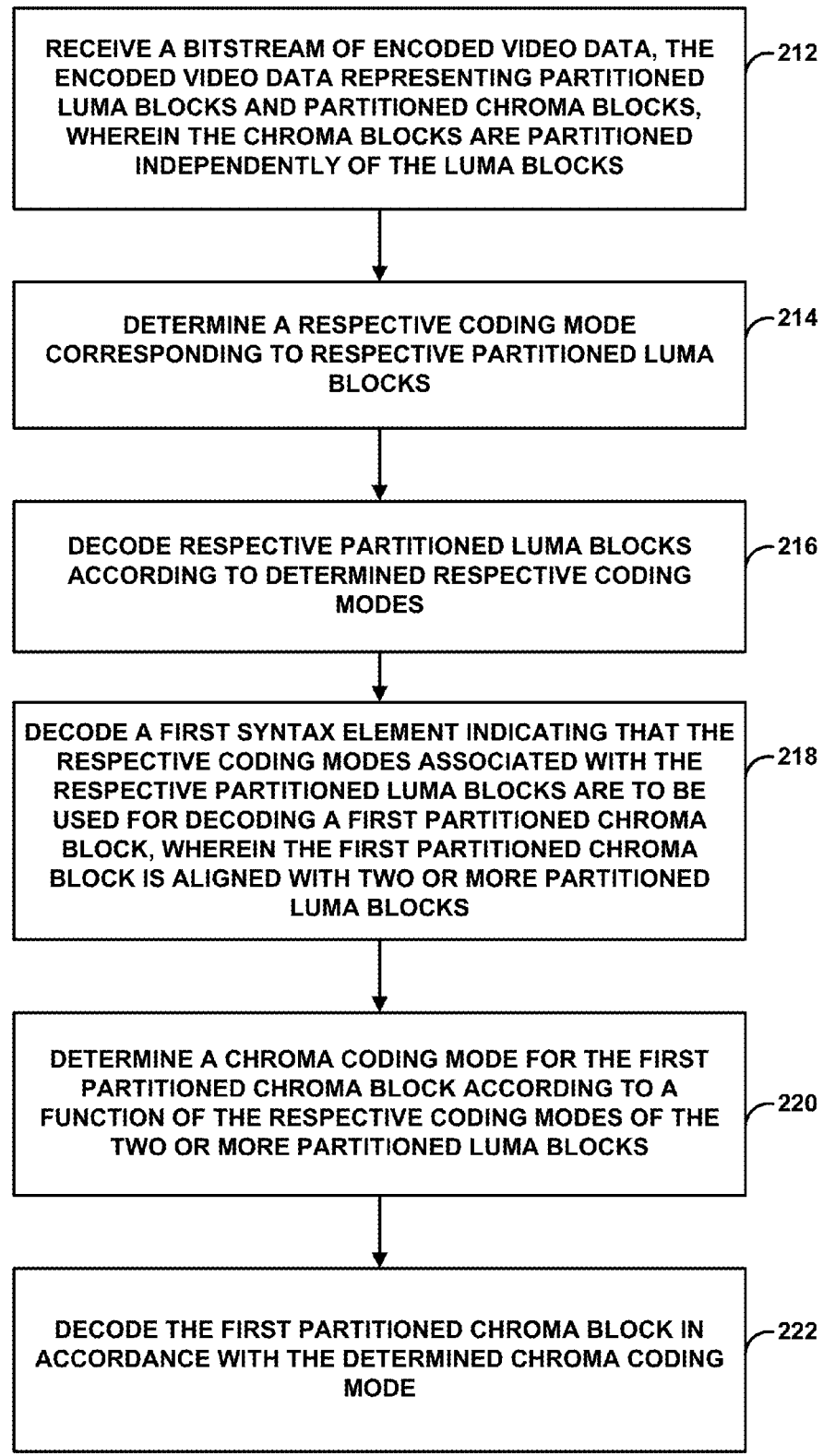
FIG. 10 is a flowchart illustrating an example operation of a video decoder in accordance with a technique of this disclosure.

FIG. 10 is a flowchart illustrating an example operation of a video decoder in accordance with a technique of this disclosure. The techniques of FIG. 10 may be performed by one or more hardware structures of video decoder 30.

In one example of the disclosure, video decoder 30 may be configured to receive the bitstream of encoded video data, the encoded video data representing partitioned luma blocks and partitioned chroma blocks, wherein the chroma blocks are partitioned independently of the luma blocks (212). Video decoder 30 may be further configured to determine a respective coding mode corresponding to the respective partitioned luma blocks (214), and decode the respective partitioned luma blocks according the determined respective coding modes (216).

Video decoder 30 may be further configured to decode a first syntax element indicating that the respective coding modes associated with the respective partitioned luma blocks are to be used for decoding a first partitioned chroma block, wherein the first partitioned chroma block is aligned with two or more partitioned luma blocks (218). Video decoder 30 may further determine a chroma coding mode for the first partitioned chroma block according to a function of the respective coding modes of the two or more partitioned luma blocks (220), and decode the first partitioned chroma block in accordance with the determined chroma coding mode (222).

In one example of the disclosure, the chroma blocks are partitioned independently of the luma blocks such that at least one partitioned chroma block is not aligned with a single partitioned luma block.

In another example of the disclosure, to determine the respective coding mode corresponding to the respective partitioned luma blocks, video decoder 30 may be further configured to receive second syntax elements corresponding to the respective partitioned luma blocks, the second syntax elements indicating the respective coding mode, and decode the second syntax elements corresponding to the respective partitioned luma blocks to determine the respective coding mode.

In another example of the disclosure, to determine the respective coding mode corresponding to the respective partitioned luma blocks, video decoder 30 is further configured to select one or more respective coding modes from one or more representative locations of the respective partitioned luma blocks. In another example, video decoder 30 is configured to select the one or more respective coding modes according to the function.

In another example, the one or more representative locations include a center representative location of the respective partitioned luma blocks, and wherein to determine the chroma coding mode for the first partitioned chroma block according to the function, video decoder 30 is further configured to obtain information indicating the determined respective coding mode stored for the center representative location.

In another example, the one or more representative locations include a corner representative location of the respective partitioned luma blocks, and wherein to determine the chroma coding mode for the first partitioned chroma block according to the function, video decoder 30 is further configured to obtain information indicating the determined respective coding mode stored for the corner representative location. In one example, the one or more representative locations comprise one or more sub-blocks.

In another example of the disclosure, video decoder 30 may be further configured to divide the respective partitioned luma blocks into respective sub-blocks, and store information indicating the determined respective coding mode in respective memory locations associated with the respective sub-blocks.

In another example of the disclosure, the function includes a location of one or more respective sub-blocks of the two or more partitioned luma blocks. In another example of the disclosure, the location of the one or more respective sub-blocks is a center sub-block of the two or more partitioned luma blocks, and wherein to determine the chroma coding mode for the first partitioned chroma block according to the function, video decoder 30 is configured to obtain the information indicating the determined respective coding mode stored for the center sub-block.

In another example of the disclosure, the location of the one or more respective sub-blocks is a corner sub-block of the two more partitioned luma blocks, and wherein to determine the chroma coding mode for the first partitioned chroma block according to the function, the video decoder 30 is configured to obtain the information indicating the determined respective coding mode stored for the corner sub-block.

In another example of the disclosure, the function includes a statistical analysis of the information indicating the determined respective coding mode in respective memory locations associated with the respective sub-blocks.

In another example of the disclosure, to determine the chroma coding mode for the first partitioned chroma block according to the function, video decoder 30 is further configured to analyze the information stored in the respective memory locations using one of a gradient or a higher derivative.

In another example of the disclosure, the information includes one or more of an indication of a direct mode for chroma prediction, a prediction direction, motion information, a flag for a position dependent intra prediction combination mode, one or more parameters for the position dependent intra prediction combination mode, one or more second transform sets for a non-separable transform, an enhanced multiple transform, an adaptive multiple transform, or one or more contexts for determining entropy coding data models.

In another example of the disclosure, video decoder 30 may configured to receive a third syntax element indicating the function.

In another example of the disclosure, video decoder 30 is part of a wireless communication device, the wireless communication device further comprising a receiver configured to receive the bitstream of encoded video data. In one example, the wireless communication device is a mobile station and the bitstream of encoded video data is received by the receiver and modulated according to a cellular communication standard.

Figure 11:
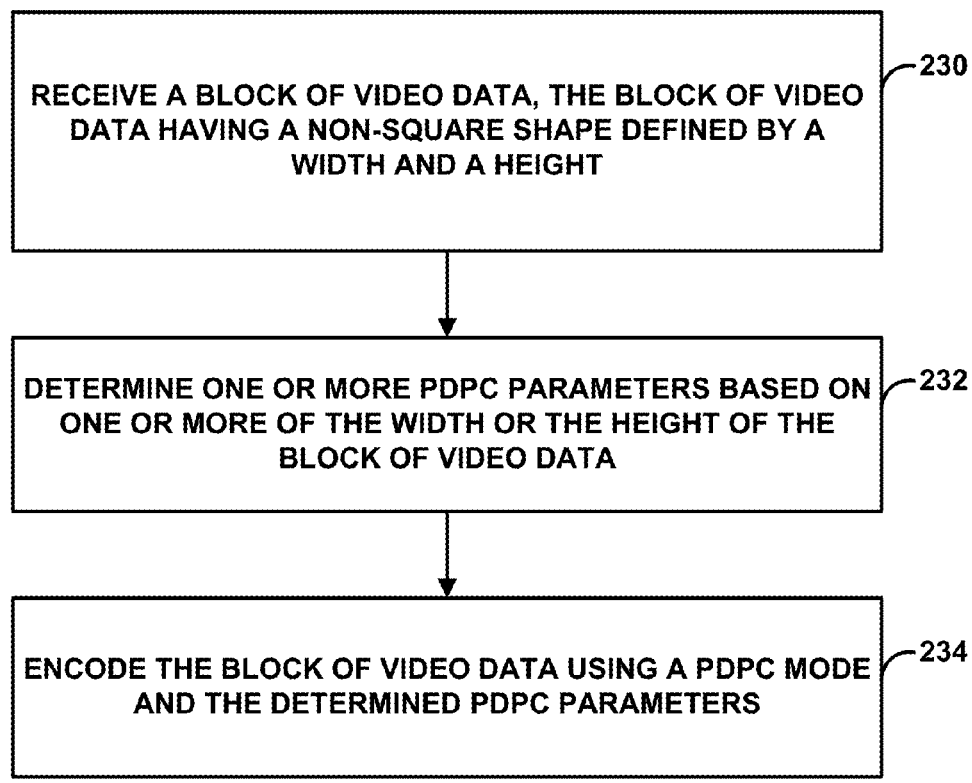
FIG. 11 is a flowchart illustrating an example operation of a video encoder in accordance with a technique of this disclosure.

FIG. 11 is a flowchart illustrating an example operation of video encoder 22 in accordance with a technique of this disclosure. The techniques of FIG. 12 may be performed by one or more hardware structures of video encoder 22.

In one example of the disclosure, video encoder 22 may be configured to receive a block of video data, the block of video data having a non-square shape defined by a width and a height (230), determine one or more PDPC parameters based on one or more of the width or the height of the block of video data (232), and encode the block of video data using a PDPC mode and the determined PDPC parameters (234). As discussed above, it should be understood that the techniques FIG. 11 may be used for determining prediction mode parameters for any prediction mode that uses non-square blocks, including prediction modes that apply a weighted average to the predictor and reference samples according to sample position.

In one example, the one or more PDPC parameters include one or more horizontally-related PDPC parameters and one or more vertically-related PDPC parameters, and wherein to determine the one or more PDPC parameters, video encoder 22 is further configured to determine the one or more horizontally-related PDPC parameters based on the width of the block of video data, and determine the one or more vertically-related PDPC parameters based on the height of the block of video data.

In another example of the disclosure, to determine the one or more horizontally-related PDPC parameters, video encoder 22 is further configured to retrieve one or more entries of one or more lookup tables as a function of the width of the block of video data, and wherein to determine the one or more vertically-related PDPC parameters, video encoder 22 is further configured to retrieve one or more entries of the one or more lookup tables as a function of the height of the block of video data.

In another example of the disclosure, to retrieve the one or more entries of the one or more lookup tables as the function of the width of the block of video data, video encoder 22 is further configured to retrieve a first index in a first lookup table based on the width of the block of video data, the first index pointing to a first entry in a second lookup table, and retrieve the one or more horizontally-related PDPC parameters in the second lookup table based on the retrieved first index. In a further example, to retrieve the one or more entries of the one or more lookup tables as the function of the of the height of the block of video data, video encoder 22 is further configured to retrieve a second index in the first lookup table based on the height of the block of video data, the second index pointing to a second entry in the second lookup table, and retrieve the one or more vertically-related PDPC parameters in the second lookup table based on the retrieved second index.

In another example of the disclosure, the one or more PDPC parameters include one or more non-directional PDPC parameters that are not horizontally-related and are not vertically-related, and wherein to determine the one or more PDPC parameters, video encoder 22 is further configured to determine the one or more non-directional PDPC parameters based on a function of the width and the height of the block of video data.

In another example of the disclosure, the function is one or more of a minimum of the width and the height of the block of video data, a maximum of the width and the height of the block of video data, or a weighted average of the width and the height of the block of video data. In a further example, to determine the one or more non-directional PDPC parameters, video encoder 22 is further configured to access one or more entries of one or more lookup tables as a function of the width and the height of the block of video data.

In another example of the disclosure, video encoder 22 is included in a wireless communication device, the wireless communication device further comprising a transmitter configured to transmit the encoded block of video data. In another example, the wireless communication device is a mobile station and the encoded block of video data is transmitted by the transmitter and modulated according to a cellular communication standard.

Figure 12:
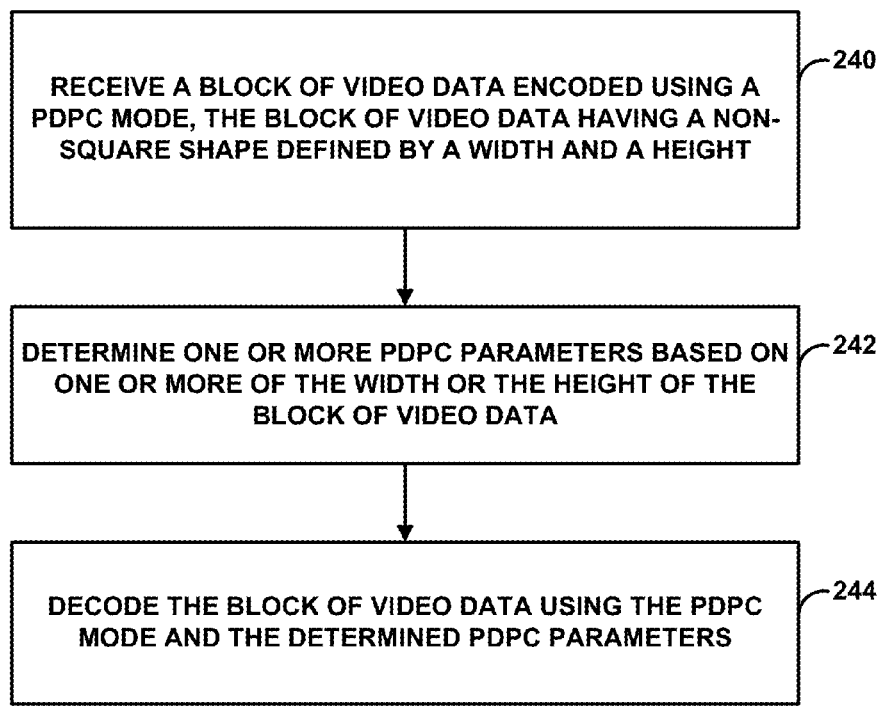
FIG. 12 is a flowchart illustrating an example operation of a video decoder in accordance with a technique of this disclosure.

FIG. 12 is a flowchart illustrating an example operation of video decoder 30 in accordance with a technique of this disclosure. The techniques of FIG. 12 may be performed by one or more hardware structures of video decoder 30.

In one example of the disclosure, video decoder 30 is configured to receive a block of video data encoded using a PDPC mode, the block of video data having a non-square shape defined by a width and a height (240), determine one or more PDPC parameters based on one or more of the width or the height of the block of video data (242), and decode the block of video data using the PDPC mode and the determined PDPC parameters (244). As discussed above, it should be understood that the techniques FIG. 12 may be used for determining prediction mode parameters for any prediction mode that uses non-square blocks, including prediction modes that apply a weighted average to the predictor and reference samples according to sample position.

In one example of the disclosure, the one or more PDPC parameters include one or more horizontally-related PDPC parameters and one or more vertically-related PDPC parameters, and wherein to determine the one or more PDPC parameters, video decoder 30 is further configured to determine the one or more horizontally-related PDPC parameters based on the width of the block of video data, and determine the one or more vertically-related PDPC parameters based on the height of the block of video data.

In another example of the disclosure, to determine the one or more horizontally-related PDPC parameters, video decoder 30 is further configured to retrieve one or more entries of one or more lookup tables as a function of the width of the block of video data, and wherein to determine the one or more vertically-related PDPC parameters, video decoder 30 is further configured to retrieve one or more entries of the one or more lookup tables as a function of the height of the block of video data.

In another example of the disclosure, to retrieve the one or more entries of the one or more lookup tables as the function of the width of the block of video data, video decoder 30 is further configured to retrieve a first index in a first lookup table based on the width of the block of video data, the first index pointing to a first entry in a second lookup table, and retrieve the one or more horizontally-related PDPC parameters in the second lookup table based on the retrieved first index. In a further example, to retrieve the one or more entries of the one or more lookup tables as the function of the of the height of the block of video data, video decoder 30 is further configured to retrieve a second index in the first lookup table based on the height of the block of video data, the second index pointing to a second entry in the second lookup table, and retrieve the one or more vertically-related PDPC parameters in the second lookup table based on the retrieved second index.

In another example, the one or more PDPC parameters include one or more non-directional PDPC parameters that are not horizontally-related and are not vertically-related, and wherein to determine the one or more PDPC parameters, video decoder 30 is further configured to determine the one or more non-directional PDPC parameters based on a function of the width and the height of the block of video data.

In another example, the function is one or more of a minimum of the width and the height of the block of video data, a maximum of the width and the height of the block of video data, or a weighted average of the width and the height of the block of video data.

In another example of the disclosure, to determine the one or more non-directional PDPC parameters, video decoder 30 is further configured to access one or more entries of one or more lookup tables as a function of the width and the height of the block of video data.

In another example of the disclosure, video decoder 30 is part of is a wireless communication device, the wireless communication device further comprising a receiver configured to receive the block of video data. In a further example, the wireless communication device is a mobile station and the block of video data is received by the receiver and modulated according to a cellular communication standard.

Certain aspects of this disclosure have been described with respect to extensions of the HEVC standard for purposes of illustration. However, the techniques described in this disclosure may be useful for other video coding processes, including other standard or proprietary video coding processes under development or not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   receiving a block of video data encoded using a position dependent intra prediction combination (PDPC) mode, the block of video data having a non-square shape defined by a width and a height;
   determining one or more horizontally-related PDPC parameters for the PDPC mode based on the width of the block of video data, wherein determining the one or more horizontally-related PDPC parameters comprises retrieving one or more entries of one or more lookup tables as a function of the width of the block of video data, including:
      retrieving a first index in a first lookup table based on the width of the block of video data, the first index pointing to a first entry in a second lookup table, and
      retrieving the one or more horizontally-related PDPC parameters in the second lookup table based on the retrieved first index;
   determining one or more vertically-related PDPC parameters based on the height of the block of video data, wherein determining the one or more vertically-related PDPC parameters comprises retrieving one or more entries of the one or more lookup tables as a function of the height of the block of video data, including:
      retrieving a second index in the first lookup table based on the height of the block of video data, the second index pointing to a second entry in the second lookup table, and
      retrieving the one or more vertically-related PDPC parameters in the second lookup table based on the retrieved second index; and
   decoding the block of video data using the PDPC mode and the determined PDPC parameters.

2. The method of claim 1, wherein the one or more PDPC parameters include one or more non-directional PDPC parameters that are not horizontally-related and are not vertically-related, and wherein determining the one or more PDPC parameters comprises:
   determining the one or more non-directional PDPC parameters based on a function of the width and the height of the block of video data.

3. The method of claim 2, wherein the function is one or more of a minimum of the width and the height of the block of video data, a maximum of the width and the height of the block of video data, or a weighted average of the width and the height of the block of video data.

4. The method of claim 3, wherein determining the one or more non-directional PDPC parameters comprises accessing one or more entries of the one or more lookup tables as a function of the width and the height of the block of video data.

5. The method of claim 1, the method being executable on a wireless communication device, wherein the device comprises:
   a memory configured to store the block of video data;
   a processor configured to execute instructions to process the block of video data stored in the memory; and
   a receiver configured to receive the block of video data.

6. The method of claim 5, wherein the wireless communication device is a mobile station and the block of video data is received by the receiver and modulated according to a cellular communication standard.

7. An apparatus configured to decode video data, the apparatus comprising:
   a memory configured to store a block of video data encoded using a position dependent intra prediction combination (PDPC) mode, the block of video data having a non-square shape defined by a width and a height; and
   one or more processors configured to:
      receive the block of video data;
      determine one or more horizontally-related PDPC parameters for the PDPC mode based on the width of the block of video data, wherein to determine the one or more horizontally-related PDPC parameters, the one or more processors are configured to retrieve one or more entries of one or more lookup tables as a function of the width of the block of video data, including:

retrieve a first index in a first lookup table based on the width of the block of video data, the first index pointing to a first entry in a second lookup table, and retrieve the one or more horizontally-related PDPC parameters in the second lookup table based on the retrieved first index;

determine one or more vertically-related PDPC parameters based on the height of the block of video data, wherein to determine the one or more vertically-related PDPC parameters, the one or more processors are further configured to retrieve one or more entries of the one or more lookup tables as a function of the height of the block of video data, including:

retrieve a second index in the first lookup table based on the height of the block of video data, the second index pointing to a second entry in the second lookup table, and retrieve the one or more vertically-related PDPC parameters in the second lookup table based on the retrieved second index; and decode the block of video data using the PDPC mode and the determined PDPC parameters.

8. The apparatus of claim 7, wherein the one or more PDPC parameters include one or more non-directional PDPC parameters that are not horizontally-related and are not vertically-related, and wherein to determine the one or more PDPC parameters, the one or more processors are further configured to determine the one or more non-directional PDPC parameters based on a function of the width and the height of the block of video data.

9. The apparatus of claim 8, wherein the function is one or more of a minimum of the width and the height of the block of video data, a maximum of the width and the height of the block of video data, or a weighted average of the width and the height of the block of video data.

10. The apparatus of claim 9, wherein to determine the one or more non-directional PDPC parameters, the one or more processors are further configured to access one or more entries of one or more lookup tables as a function of the width and the height of the block of video data.

11. The apparatus of claim 7, wherein the apparatus is a wireless communication device, the apparatus further comprising:

a receiver configured to receive the block of video data.

12. The apparatus of claim 11, wherein the wireless communication device is a mobile station and the block of video data is received by the receiver and modulated according to a cellular communication standard.

13. An apparatus configured to decode video data, the apparatus comprising:

means for receiving a block of video data encoded using a position dependent intra prediction combination (PDPC) mode, the block of video data having a non-square shape defined by a width and a height;

means for determining one or more horizontally-related PDPC parameters for the PDPC mode based on the width of the block of video data, wherein determining the one or more horizontally-related PDPC parameters comprises retrieving one or more entries of one or more lookup tables as a function of the width of the block of video data, including:

means for retrieving a first index in a first lookup table based on the width of the block of video data, the first index pointing to a first entry in a second lookup table, and means for retrieving the one or more horizontally-related PDPC parameters in the second lookup table based on the retrieved first index;

means for determining one or more vertically-related PDPC parameters based on the height of the block of video data, wherein determining the one or more vertically-related PDPC parameters comprises retrieving one or more entries of the one or more lookup tables as a function of the height of the block of video data, including:

means for retrieving a second index in the first lookup table based on the height of the block of video data, the second index pointing to a second entry in the second lookup table, and means for retrieving the one or more vertically-related PDPC parameters in the second lookup table based on the retrieved second index; and means for decoding the block of video data using the PDPC mode and the determined PDPC parameters.

14. A non-transitory computer-readable storage medium having instructions stored thereon that, when executed, cause one or more processors of a device to configured to decode video data to:

receive a block of video data encoded using a position dependent intra prediction combination (PDPC) mode, the block of video data having a non-square shape defined by a width and a height;

determine one or more horizontally-related PDPC parameters for the PDPC mode based on the width of the block of video data, wherein to determine the one or more horizontally-related PDPC parameters, the instructions further cause the one or more processors to retrieve one or more entries of one or more lookup tables as a function of the width of the block of video data, including:

retrieve a first index in a first lookup table based on the width of the block of video data, the first index pointing to a first entry in a second lookup table, and retrieve the one or more horizontally-related PDPC parameters in the second lookup table based on the retrieved first index;

determine one or more vertically-related PDPC parameters based on the height of the block of video data, wherein to determine the one or more vertically-related PDPC parameters, the instructions further cause the one or more processors to retrieve one or more entries of the one or more lookup tables as a function of the height of the block of video data, including:

retrieve a second index in the first lookup table based on the height of the block of video data, the second index pointing to a second entry in the second lookup table, and retrieve the one or more vertically-related PDPC parameters in the second lookup table based on the retrieved second index; and decode the block of video data using the PDPC mode and the determined PDPC parameters.

15. A method of encoding video data, the method comprising:

receiving a block of video data, the block of video data having a non-square shape defined by a width and a height;

determining one or more horizontally-related position dependent intra prediction combination (PDPC) parameters for a PDPC prediction mode based on the width of the block of video data, wherein determining the one or more horizontally-related PDPC parameters comprises retrieving one or more entries of one or more lookup tables as a function of the width of the block of video data, including:
retrieving a first index in a first lookup table based on the width of the block of video data, the first index pointing to a first entry in a second lookup table, and
retrieving the one or more horizontally-related PDPC parameters in the second lookup table based on the retrieved first index;
determining one or more vertically-related PDPC parameters based on the height of the block of video data, wherein determining the one or more vertically-related PDPC parameters comprises retrieving one or more entries of the one or more lookup tables as a function of the height of the block of video data, including:
retrieving a second index in the first lookup table based on the height of the block of video data, the second index pointing to a second entry in the second lookup table, and
retrieving the one or more vertically-related PDPC parameters in the second lookup table based on the retrieved second index; and
encoding the block of video data using the prediction mode and the determined one or more parameters.

16. The method of claim 15, wherein the one or more PDPC parameters include one or more non-directional PDPC parameters that are not horizontally-related and are not vertically-related, and wherein determining the one or more PDPC parameters comprises:
determining the one or more non-directional PDPC parameters based on a function of the width and the height of the block of video data.

17. The method of claim 16, wherein the function is one or more of a minimum of the width and the height of the block of video data, a maximum of the width and the height of the block of video data, or a weighted average of the width and the height of the block of video data.

18. The method of claim 17, wherein determining the one or more non-directional PDPC parameters comprises accessing one or more entries of one or more lookup tables as a function of the width and the height of the block of video data.

19. The method of claim 15, the method being executable on a wireless communication device, wherein the device comprises:
a memory configured to store the block of video data;
a processor configured to execute instructions to process the block of video data stored in the memory; and
a transmitter configured to transmit the encoded block of video data.

20. The method of claim 19, wherein the wireless communication device is a mobile station and the encoded block of video data is transmitted by the transmitter and modulated according to a cellular communication standard.

21. An apparatus configured to encode video data, the apparatus comprising:
a memory configured to store a block of video data, the block of video data having a non-square shape defined by a width and a height; and
one or more processors configured to:
receive the block of video data;
determine one or more horizontally-related position dependent intra prediction combination (PDPC) parameters for a PDPC prediction mode based on the width of the block of video data, wherein to determine the one or more horizontally-related PDPC parameters, the one or more processors are configured to retrieve one or more entries of one or more lookup tables as a function of the width of the block of video data, including:
retrieve a first index in a first lookup table based on the width of the block of video data, the first index pointing to a first entry in a second lookup table, and
retrieve the one or more horizontally-related PDPC parameters in the second lookup table based on the retrieved first index;
determine one or more vertically-related PDPC parameters based on the height of the block of video data, wherein to determine the one or more vertically-related PDPC parameters, the one or more processors are further configured to retrieve one or more entries of the one or more lookup tables as a function of the height of the block of video data, including:
retrieve a second index in the first lookup table based on the height of the block of video data, the second index pointing to a second entry in the second lookup table, and
retrieve the one or more vertically-related PDPC parameters in the second lookup table based on the retrieved second index; and
encode the block of video data using the prediction mode and the determined one or more parameters.

22. The apparatus of claim 21, wherein the one or more PDPC parameters include one or more non-directional PDPC parameters that are not horizontally-related and are not vertically-related, and wherein to determine the one or more PDPC parameters, the one or more processors are further configured to determine the one or more non-directional PDPC parameters based on a function of the width and the height of the block of video data.

23. The apparatus of claim 22, wherein the function is one or more of a minimum of the width and the height of the block of video data, a maximum of the width and the height of the block of video data, or a weighted average of the width and the height of the block of video data.

24. The apparatus of claim 23, wherein to determine the one or more non-directional PDPC parameters, the one or more processors are further configured to access one or more entries of one or more lookup tables as a function of the width and the height of the block of video data.

25. The apparatus of claim 21, wherein the apparatus is a wireless communication device, the apparatus further comprising:
a transmitter configured to transmit the encoded block of video data.

26. The apparatus of claim 25, wherein the wireless communication device is a mobile station and the encoded block of video data is transmitted by the transmitter and modulated according to a cellular communication standard.

* * * * *